United States Patent
Fukutome et al.

(10) Patent No.: US 8,311,768 B2
(45) Date of Patent: Nov. 13, 2012

(54) STEP COUNT MEASURING SYSTEM

(75) Inventors: Hideaki Fukutome, Kyoto (JP); Naoya Morimura, Kyoto (JP); Hirofumi Matsuoka, Tokyo (JP)

(73) Assignees: Nintendo Co., Ltd., Kyoto (JP); Creatures Inc., Tokyo (JP)

( * ) Notice: Subject to any disclaimer, the term of this patent is extended or adjusted under 35 U.S.C. 154(b) by 769 days.

(21) Appl. No.: 12/492,655

(22) Filed: Jun. 26, 2009

(65) Prior Publication Data

US 2009/0323888 A1   Dec. 31, 2009

(30) Foreign Application Priority Data

Jun. 27, 2008   (JP) .................................. 2008-168054

(51) Int. Cl.
*G06F 15/00* (2006.01)

(52) U.S. Cl. .......... 702/160; 702/141; 377/20; 377/24.2

(58) Field of Classification Search ................... 702/160, 702/141; 235/105; 482/8, 74; 600/300, 600/587; 377/20, 24.2
See application file for complete search history.

(56) References Cited

U.S. PATENT DOCUMENTS

| | | | | |
|---|---|---|---|---|
| 4,649,552 A | * | 3/1987 | Yukawa | ........................... 377/24 |
| 4,771,394 A | * | 9/1988 | Cavanagh | ..................... 702/160 |
| 5,976,083 A | * | 11/1999 | Richardson et al. | .......... 600/300 |

FOREIGN PATENT DOCUMENTS

| JP | 2003-307431 | 10/2003 |
|---|---|---|
| JP | 2004-226076 | 8/2004 |

* cited by examiner

*Primary Examiner* — Jonathan C Teixeira Moffat
*Assistant Examiner* — Hien Vo
(74) *Attorney, Agent, or Firm* — Nixon & Vanderhye P.C.

(57) ABSTRACT

A step count measuring system includes a pedometer and a step count managing apparatus which are able to communicate with each other. In the pedometer, a step count value sequentially detected for each unit of time is stored, and a time counted in the pedometer is stored as first time data by being brought into associated with each of the step count values. When a battery is replaced in the pedometer, a reset is executed to start initialization processing, and the time stored as first time data is stored as second time data which can be discriminated from the first time data. A recording time of each of the step count values being associated with the first time data before the initialization processing is set on the basis of the time counted by the step count managing apparatus, and a recording time of each of the step count values being associated with the second time data after the initialization processing is set on the basis of the second time data.

15 Claims, 15 Drawing Sheets

FIG. 2
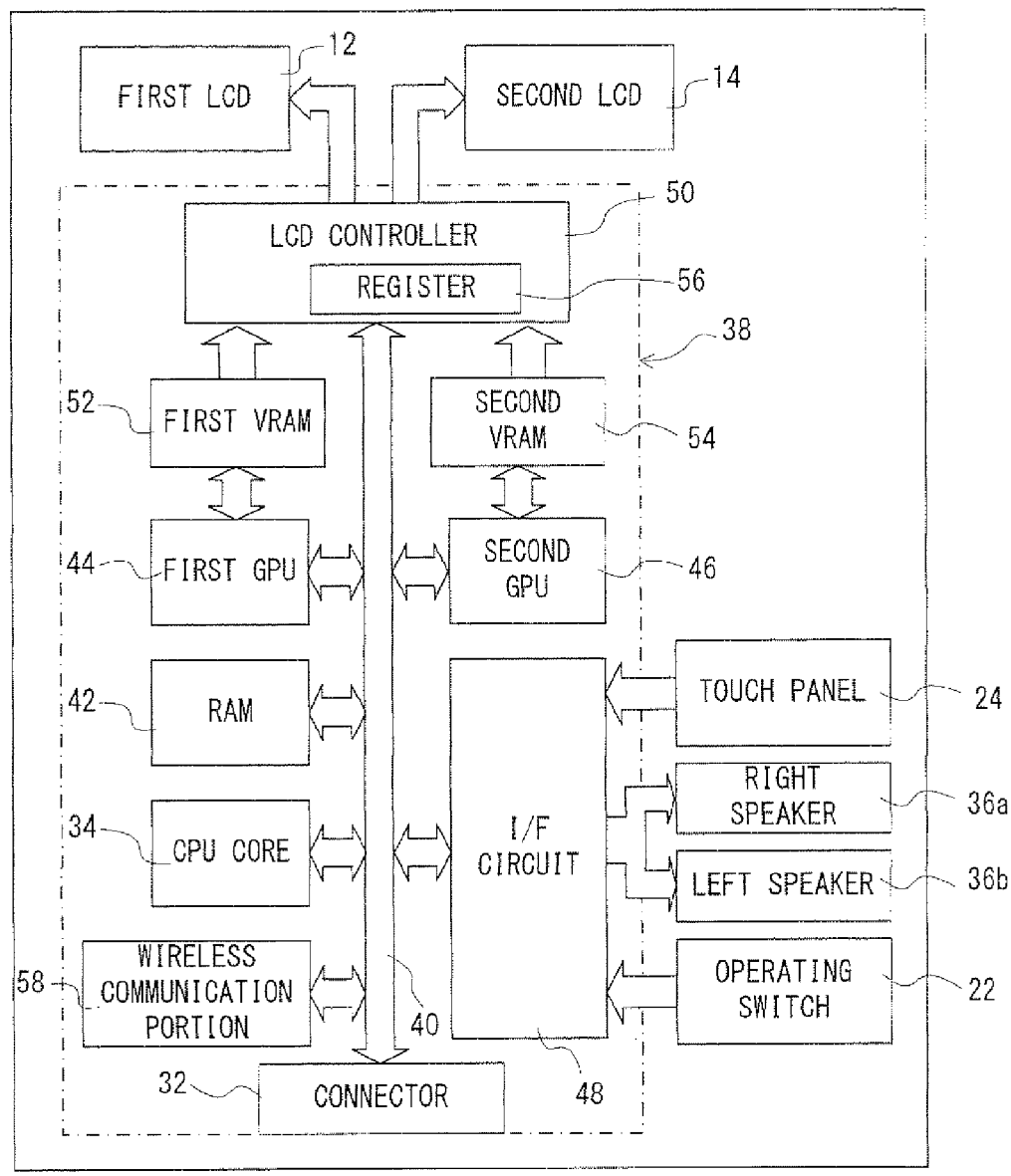
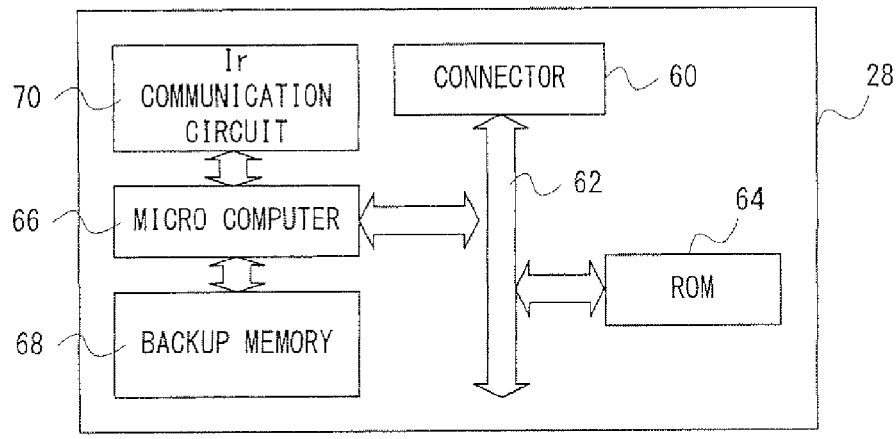

FIG. 7
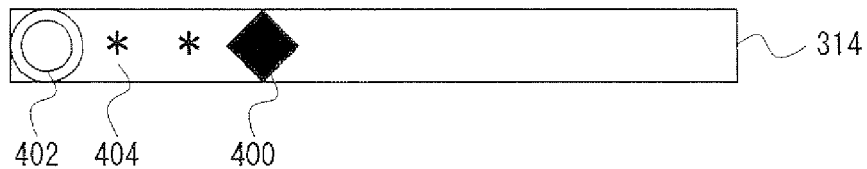
FIG. 8
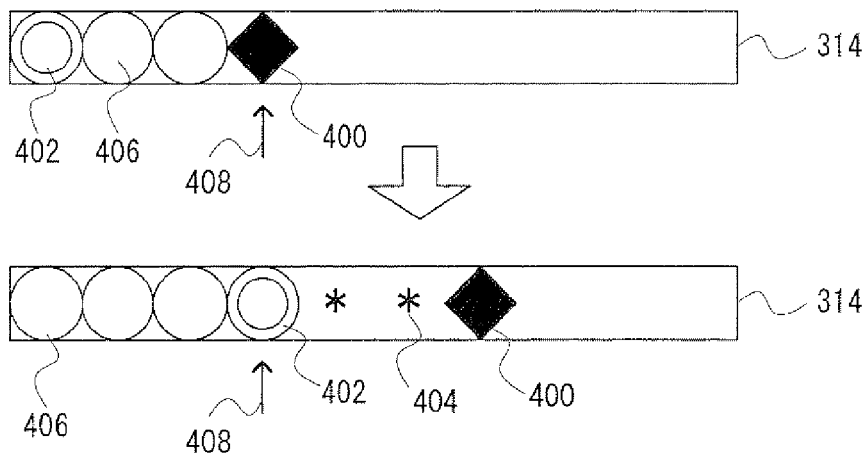
FIG. 9
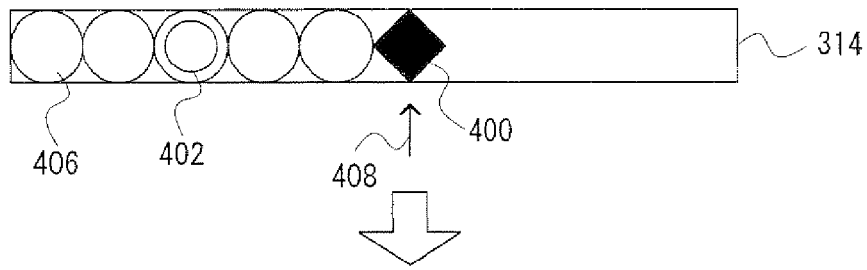
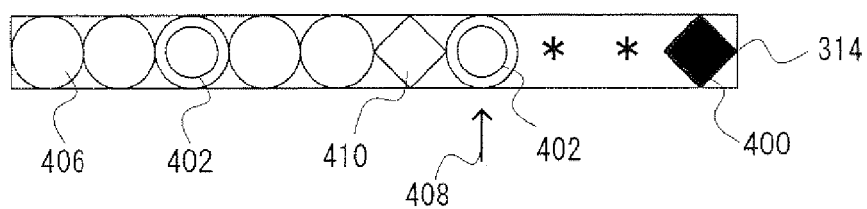

ACQUISITION OF STEP COUNT LOG BEFORE BATTERY EXHAUSTION

ACQUISITION OF LATEST STEP COUNT LOG

US 8,311,768 B2

STEP COUNT MEASURING SYSTEM

CROSS REFERENCE OF RELATED APPLICATION

The disclosure of Japanese Patent Application No. 2008-168054 is incorporated herein by reference.

BACKGROUND

Field

Example embodiments of the present invention relate to a step count measuring system. More specifically, example embodiments of the present invention relate to a step count measuring system including a pedometer and a step count managing apparatus which can communicate with each other.

Conventionally, a system in which step counts detected by a pedometer are transmitted to an external, terminal, and in the external terminal, the step count data received from the pedometer are managed is known.

For example, in a system disclosed in a Patent Document 1 (Japanese Patent Application Laid-Open No. 2003-307431 [G01C 22/00, A63B 69/00, G06F 17/60, G06M 7/00, G08C 19/00]), step counts detected in a pedometer for each predetermined unit of time (one minute, for example) are stored in a memory. When the step counts are transmitted to an external terminal, a recording time is added to the step count for each unit of time stored in the memory on the basis of the current time counted by a clock portion of the pedometer. Furthermore, it is disclosed that the processing of adding the recording time to the step count may be performed on the basis of the time counted by the external terminal.

Similarly, in a Patent Document 2 (Japanese Patent Application Laid-Open No. 2004-226076 [G01C 22/00]), by taking the date and time attached to a data registration mail to be sent from a mobile phone to a server as a reference, a counting start time is calculated by going back the step counts for each predetermined unit of time, and the step counts for each predetermined unit of time and the time are brought into correspondence to each other on the basis the counting start time. Furthermore, the fact that the times and the step counts may be brought into correspondence to each other by a pedometer is also disclosed.

However, according to the above-described Patent Documents 1 and 2, since a recording time is added to the step count by taking any one of the time of the pedometer or the time of the external terminal as a reference, there is a problem that if a battery of the pedometer is replaced, it is impossible to adding accurate recording times to the step counts before and after the replacement of the battery. That is, although there is a blank time between the recording time before the battery runs out and the recording time after the battery runs out, in the methods of the above-described Patent Documents 1 and 2, the recording time is added without taking the blank time into consideration, and therefore, there is a problem that the recording time of the step count before the replacement of the battery (or after the replacement of the battery) is widely different from the actual time.

SUMMARY

Therefore, example embodiments of the present invention provide a novel step count measuring system, a pedometer and a storage medium storing this program, and a step count managing apparatus and a storage medium storing this program.

Other example embodiments of the present invention provide a step count measuring system, a pedometer and a storage medium storing the program, and a step count managing apparatus and a storage medium storing the program which are able to improve accuracy of a recording time of a step count.

Other example embodiments of the present invention provide a step count measuring system, a pedometer and a storage medium storing the program, a step count managing apparatus and a storage medium storing the program which are able to appropriately set a recording time of a step count depending on a presence or absence of a replacement of a battery of the pedometer.

Example embodiments of the present invention employ following features in order to solve the above-described problems. It should be noted that reference numerals and the supplements inside the parentheses show one example of a corresponding relationship with the embodiments described later for easy understanding of the present invention, and do not limit the present invention.

A first invention is a step count measuring system including a pedometer and a step count managing apparatus which are able to communicate with each other. The pedometer comprises a first time-counting means for counting a time, a detecting means for detecting a step count value for each unit of time, a step count data storing means for storing the step count value sequentially detected by the detecting means, a first time data storing means for storing, as first time data, the time counted by the first time-counting means by bringing it into associated with the step count value stored by the step count data storing means, and a second time data storing means for storing the time stored as the first time data by the first time data storing means as second time data being distinguishable from the first time data in initialization processing started in response to a reset. The step count managing apparatus comprises a second time-counting means for counting a time. The step count measuring system further comprises a first recording time setting means for setting a recording time of each step count value being associated with the first time data on the basis of the time counted by the second time-counting means, and a second recording time setting means for setting a recording time of each step count value being associated with the second time data on the basis of the second time data.

In the first invention, a step count measuring system (1000) includes a pedometer (100) and a step count managing apparatus (10) which are able to communicate with each other. The pedometer has a first time-counting means (110, 312) for counting a time (t2), and a step count value for each unit of time (one minute, for example) is detected by a detecting means (110, 114). A step count data storing means (110, 116, 314, S5) stores the step count value sequentially detected by the detecting means. A first time data storing means (110, 116, 314, S3) stores, as first time data, the time counted by the first time-counting means by bringing it into associated with the stored step count value. In the pedometer, when a reset is performed due to a replacement of the battery, malfunction, etc., initialization processing is started. In this initialization processing, the second time data storing means (110, 116, S17) stores the time stored as the first time data as second time data being distinguishable from the first time data. That is, when the reset is performed, each step count value stored by being brought into associated with the first time data is stored by being brought into association with the second time data. On the other hand, the step count managing apparatus has a second time-counting means (34, 210) for counting a time (t1). The step count measuring system, further comprises a first recording time setting means and a second recording time setting means for setting a time corresponding to each step count value, and the first recording time setting means and the second recording time setting means are provided to any one of the pedometer and the step count managing apparatus. That is, the first recording time setting means is provided to any one of the pedometer and the step count managing apparatus, and the second recording time setting means is provided to any one of the pedometer and the step count managing apparatus. A first recording time setting means (34, 110, S137) sets a recording time of each step count value being associated with the first time data on the basis of the time counted by the second time-counting means. A second recording time setting means (34, 110, S123) sets a recording time of each step count value being associated with the second time data on the basis of the time of the second time data.

According to the first invention, in the initialization processing, the first time data being associated with the step count values which has been stored before the initialization is stored as second time data being distinguishable from the first time data, and therefore, it is possible to distinguish the step count values and the times between before and the after the initialization processing. Accordingly, the recording time of each step count value stored after the initialization processing can be set on the basis of the time of the step count managing apparatus, and the recording time of each step count value stored before the initialization processing can be set on the basis of the time of the pedometer. That is, with respect to the step count values which is stored successive to the step count value which is being detected now, that is, the latest (which is being recorded now) step count value, the recording time can be set on the basis of the current time of the step count managing apparatus. On the other hand, with respect to the step count value which is not successive to the step count value which is being recorded, that is, the step count values stored before the initialization processing, the recording time can be set on the basis of the time on the side of the pedometer stored as second time data. Accordingly, it is possible to improve accuracy of the recording time of the step counts. Furthermore, it is possible to set an appropriate recording time depending on the presence or absence of the initialization processing occurring due to a replacement of the battery in the pedometer, etc. In addition, there is little need of concerning about the accuracy of the time of the pedometer, so that a cheap pedometer can be used, capable of implementing cost savings of the step count measuring system.

A second invention is according to the first invention, and a step count managing apparatus further comprises a data acquiring means for acquiring at least the step count value stored by the step count data storing means and the second time data stored by the second time data storing means from the pedometer, and the first recording time setting means and the second recording time setting means are provided to the step count managing apparatus, and performs settings of the recording times on the basis of the data acquired by the data acquiring means.

In the second invention, the step count managing apparatus is provided with the first recording time setting means and the second recording time setting means, so that a setting of the recording time is performed on the side of the step count managing apparatus. By a data acquiring means (34, S115-S117, S129-S135) of the step count managing apparatus, the step count value and the second time data required for setting the recording time are acquired from the pedometer. Since the setting of the recording time of each step count value can be performed in the step count managing apparatus, it is possible to reduce a processing load on the pedometer.

A third invention is according to the second invention, and the pedometer further comprises an initializing flag storing means for storing a flag to indicate whether or not the initialization processing is executed, the step count managing apparatus further comprises a first determining means for determining whether or not initialization processing is executed in the pedometer by the flag acquired from the pedometer, and the data acquiring means acquires the second time data and the step count value being associated with the second time data from the pedometer when the first determining means determines that the initialization processing is executed.

In the third invention, in the pedometer, a flag for indicating whether or not initialization processing is executed is stored by an initializing flag storing means (110, 116, S25). A first determining means (34, S111, S161-S163, S171, S113) of the step count managing apparatus determines whether or not the initialization processing is executed in the pedometer by the acquired flag. The data acquiring means acquires the second time data and the step count value which are required for setting the recording time of the step count values before the initialization processing when it is determined that the initialization processing is executed. Accordingly, only when the initialization processing is executed, the data stored before the initialization processing (step count value and second time data) can be requested to the pedometer, and in the pedometer, searching and transmitting the data stored before the initialization processing is executed as necessary, and therefore, it is possible to reduce processing load on the pedometer. Furthermore, processing of constantly transmitting all the data stored in the pedometer to the step count managing apparatus and processing of searching data before the initialization processing in the step count managing apparatus are not executed, but processing of transmitting only the necessary data from the pedometer is executed, capable of reducing in the amount of data to be communicated.

A fourth invention is according to the second invention, and the step count managing apparatus further comprises a previously-acquired-time storing means for storing the time counted by the second time-counting means as a previously-acquired time when the recording time of the step count value being associated with the first time data by the first recording time setting means is set, the pedometer further comprises a number detecting means for detecting the number of step count values stored from the previously-acquired time acquired from the step count managing apparatus to the present, the step count managing apparatus further comprises a second determining means for determining whether or not the initialization processing is executed in the pedometer on the basis of the number of step count values acquired from the pedometer, and the data acquiring means acquires the second time data and the step count value being associated with the second time data from the pedometer when the second determining means determines that the initialization processing is executed.

In the fourth invention, in the step count managing apparatus, when the recording time of the step count value being associated with the first time data is set, that is, when setting of the recording time based on the time counted by the second time-counting means is executed with respect to the latest step count value, the time counted by second time-counting means is stored as a previously-acquired time (t3) by a previously-acquired-time storing means (34, S149). By storing the previously-acquired time, it is possible to determine whether or not the initialization processing is executed from the previously-acquired time to the present in the pedometer. More specifically, in the pedometer, a number detecting means (110, S63) detects the number of step count values stored from the previously-acquired time acquired from the step count managing apparatus to the present, and a second determining means (34, S111, S167-S171, S113) of the step count managing apparatus determines whether or not the initialization processing is executed in the pedometer on the basis of the number of step count values acquired from the pedometer. Then, the data acquiring means acquires the second time data and the step count value which are required for setting the recording time of the step count value stored before the initialization processing when it is determined that the initialization processing is executed in the pedometer. Accordingly, similarly to the above-described invention, the necessary data is acquired when needed, and therefore, it is possible to decrease a processing load and reduce an amount of data to be communicated. In addition, execution of the initialization processing is determined on the basis of the number of step count values stored from the previously-acquired time to the present, and therefore, even if a pedometer is shared, in a plurality of software, in the processing of each software, execution of the initialization processing in the pedometer can be detected. For example, in a case that a flag which is turned on in response to execution of the initialization processing and is turned off in response to transmission processing of the step count data is stored in the pedometer, the above-described flag is switched in the processing of each software, and therefore, when the step count data has already been acquired in the step count managing apparatus in the processing of another software, execution of the initialization processing cannot be detected in the software executed next. However, in a case that the number of step count values from the previously-acquired time to the present is detected, even if another software has already been executed, the number of step count values is not changed, and therefore, it is possible to detect execution of the initialization processing even in the software to be executed next.

A fifth invention is according to the first invention, and the step count data storing means stores each step count value in an address order, the first time data storing means stores the time corresponding to one step count value as the first time data, the first recording time setting means sets the recording time of each of the step count values being associated with the first time data on the basis of the address order and the time counted by the second time-counting means, and the second recording time setting means sets the recording time of each of the step count values being associated on the basis of the address order and the second time data.

In the fifth invention, the step count data storing means stores respective step count values sequentially detected in an address order. Thus, by storing only the time corresponding to one step count value, it is possible to calculate the time of each of the respective step count values on the basis of this time. Accordingly, the first time data storing means stores the time corresponding to the one step count value as first time data. Then, the recording time of each step count value being associated with the first time data is set on the basis of the address order and the time counted by the second time-counting means, and the recording time of each step count value being associated with, the second time data is set on the basis of the address order and the second time data. Accordingly, there is no need of storing a time for each step count value, capable of saving a capacity of a memory for storing step count data.

A sixth invention is according to the first invention, and the first time data storing means stores the time counted by the first time-counting means every predetermined timing by changing a storing position.

In the sixth invention, the first time data is updated at a predetermined timing by the first time data storing means (S1-S3), and when, it is updated, the time stored by the first time-counting means is stored by changing a storing position. Accordingly, it is possible to prevent a specific position of the memory from being often rewritten, and prevent a life of rewriting from being shortened.

A seventh invention is according to the first invention, and the step count managing apparatus further comprises a time transmitting means for transmitting the time counted by the second time-counting means to the pedometer, and the pedometer further comprises a time setting means for setting, when the time transmitted by the time transmitting means is received, the time counted by the first time-counting means to the received time.

In the seventh invention, by a time transmitting means (34, S165) of the step count managing apparatus, the time counted by the second time-counting means is transmitted to the pedometer. In the pedometer, by a time setting means (110, S41-S45), the time counted by the first time-counting means is set to the received time. Accordingly, the time on the side of the pedometer can be modified to the time on the side of the step count managing apparatus, which allows low accuracy of the clock of the pedometer and thus reduction in the manufacturing cost of the pedometer.

An eighth invention is according to the seventh invention, and the first time data storing means further stores a flag for indicating whether or not the time is the time on which the setting by the time setting means has been performed, and the second recording time setting means does not perform setting of the recording time of each step count value being associated with the second time data when it is determined by the flag that the second time data is not the time on which the setting by the time setting means has been performed.

In the eighth invention, the first time data storing means (110, S25, S49) further stores a flag for indicating whether or not the time is the time on which the setting by the time setting means has been performed. When it is determined by the flag that the second time data is not the time on which the setting by the time setting means has been performed, the second recording time setting means (34, S121-S123) does not perform setting of the recording time of each step count value being associated with the second time data. In a case that the time of the pedometer is not set to the time of the step count managing apparatus, since the time of each of the step count values stored before the initialization processing is unclear, it is possible to make the step count value ineffective. For example, it is possible to remove inaccurate step count data of the time information when the battery is repetitively detached and attached due to unsmooth replacement of the battery, or when the battery is replaced with a battery with less remaining amount.

A ninth invention is according to the first invention, and a plurality of pedometers are included, the first recording time setting means sets the recording time of each step count value of each pedometer being associated with the first time data on the basis of the time counted by the second time-counting means, and the second recording time setting means sets the recording time of each step count value of each pedometer being associated with the second time data on the basis of the second time data of each pedometer.

In the ninth invention, a step count measuring system includes a plurality of pedometers, and step count data of the plurality of pedometers are managed by a step count managing apparatus. The recording time of each step count value of each pedometer being associated with the first time data is set on the basis of the time of the step count managing apparatus, and the recording time of each step count value of each pedometer being associated, with the second time data is set on the basis of the second time data of each pedometer. Thus, even if the battery of the pedometer is replaced, it is possible to appropriately set the recording times of the step counts before the replacement of the battery and the step counts after the replacement of the battery. Specifically, with respect to the step counts before the replacement of the battery, the recording time is set on the basis of the time stored in each of the pedometers, and therefore, it is possible to retain accuracy of the recording time of the step count. Furthermore, with respect to the step counts after the replacement of the battery, the recording time is set on the basis of the time of the step count managing apparatus, and therefore, even if the plurality of pedometers tick different times, it is possible to easily synchronize the times of the respective pedometers by conforming the times. Even if the system including the plurality of pedometers is constructed, it is possible to improve accuracy of the recording time of the step counts.

A tenth invention is a pedometer which is able to communicate with a step count managing apparatus for setting a recording time of a step count in a step count measuring system. The pedometer comprises a first time-counting means for counting a time, a detecting means for detecting a step count value for each unit of time, a step count data storing means for storing the step count value sequentially detected by the detecting means, a first time data storing means for storing, as first time data, the time counted by the first time-counting means by bringing it into associated with the step count value stored by the step count data storing means, a second time data storing means for storing the time stored as the first time data by the first time data storing means as second time data being distinguishable from the first time data in initialization processing started in response to a reset, and a data transmitting means for transmitting at least the step count value stored by the step count data storing means and the second time data stored by the second time data storing means to the step count managing apparatus.

An eleventh invention is a storage medium storing a program of a pedometer which is able to communicate with a step count managing apparatus which sets a recording time of a step count in a step count measuring system. The program causes a computer of the pedometer to function as a first time-counting means for counting a time, a detecting means for detecting a step count value for each unit of time, a step count data storing means for storing the step count value sequentially detected by the detecting means, a first time data storing means for storing, as first time data, the time counted by the first time-counting means by bringing it into associated with the step count value stored by the step count data storing means, a second time data storing means for storing the time stored as the first time data by the first time data storing means as second time data being distinguishable from the first time data in initialization processing started in response to a reset, and a data transmitting means for transmitting at least the step count value stored by the step count data storing means and the second time data stored by the second time data storing means to the step count managing apparatus.

In the tenth and eleventh inventions, it is possible to provide the pedometer and the storage medium storing the program to be utilized in the above-described step count measuring system.

A twelfth invention is a step count managing apparatus for setting a recording time of a step count detected by a pedometer in a step count measuring system. The pedometer comprises a first time-counting means for counting a time, a detecting means for detecting a step count value for each unit of time, a step count data storing means for storing the step count value sequentially detected by the detecting means, a first time data storing means for storing, as first time data, the time counted by the first time-counting means by bringing it into associated with the step count value stored by the step count data storing means and a second time data storing means for storing the time stored as the first time data by the first time data storing means as second time data being distinguishable from the first time data in initialization processing started in response to a reset. The step count managing apparatus comprises a second time-counting means for counting a time, a data acquiring means for acquiring at least the step count value stored by the step count data storing means and the second time data stored by the second time data storing means from the pedometer, a first recording time setting means for setting a recording time of each step count value being associated with the first time data on the basis of the time counted by the second time-counting means, and a second recording time setting means for setting a recording time of each step count value being associated with the second time data on the basis of the second time data.

A thirteenth invention is a storage medium, for storing a program of a step count managing apparatus which sets a recording time of a step count detected by a pedometer in a step count measuring system. The pedometer comprises a first time-counting means for counting a time, a detecting means for detecting a step count value for each unit of time, a step count data storing means for storing the step count value sequentially detected by the detecting means, a first time data storing means for storing, as first time data, the time counted by the first time-counting means by bringing it into associated with the step count value stored by the step count data storing means, and a second time data storing means for storing the time stored as the first time data by the first time data storing means as second time data being distinguishable from the first time data in initialization processing started in response to a reset. This program causes a computer of the step count managing apparatus to execute a second time-counting means for counting a time, a data acquiring means for acquiring the step count value stored by the step count data storing means and the second time data stored by the second time data storing means from the pedometer, a first recording time setting means for setting a recording time of each step count value being associated with the first time data on the basis of the time counted by the second time-counting means, and a second recording time setting means for setting a recording time of each step count value being associated with the second time data on the basis of the second time data.

In the twelfth and thirteenth inventions, it is possible to provide the step count managing apparatus and the storage medium storing the program to be utilized in the above-described step count measuring system.

According to example embodiments of the present invention, with respect to the step count value after the initialization processing, the recording time is set on the basis of the time of the step count managing apparatus, and with respect to the step count value before the initialization processing, the recording time can be set on the basis of the time of the pedometer, and therefore, it is possible to improve accuracy of the recording time of the step count. Furthermore, depending on the presence or absence of the replacement of the battery in the pedometer, that is, between before and after the initialization processing, different settings of the recording time of the step counts can be used, and therefore, it is possible to appropriately set the recording time of the step counts.

The above described features, aspects and advantages of example embodiments of the present invention will become more apparent from the following detailed description of the present invention when taken in conjunction with the accompanying drawings.

BRIEF DESCRIPTION OF THE DRAWINGS

FIG. 2 is a block diagram showing one example of an electric configuration of a game apparatus;

FIG. 7 is an illustrative view showing a currently-effective date block stored in a step count log buffer;

FIG. 8 is an illustrative view showing a movement of the currently-effective date block;

FIG. 9 is an illustrative view showing initialization processing;

DETAILED DESCRIPTION OF THE EXAMPLE EMBODIMENTS

Figure 1:
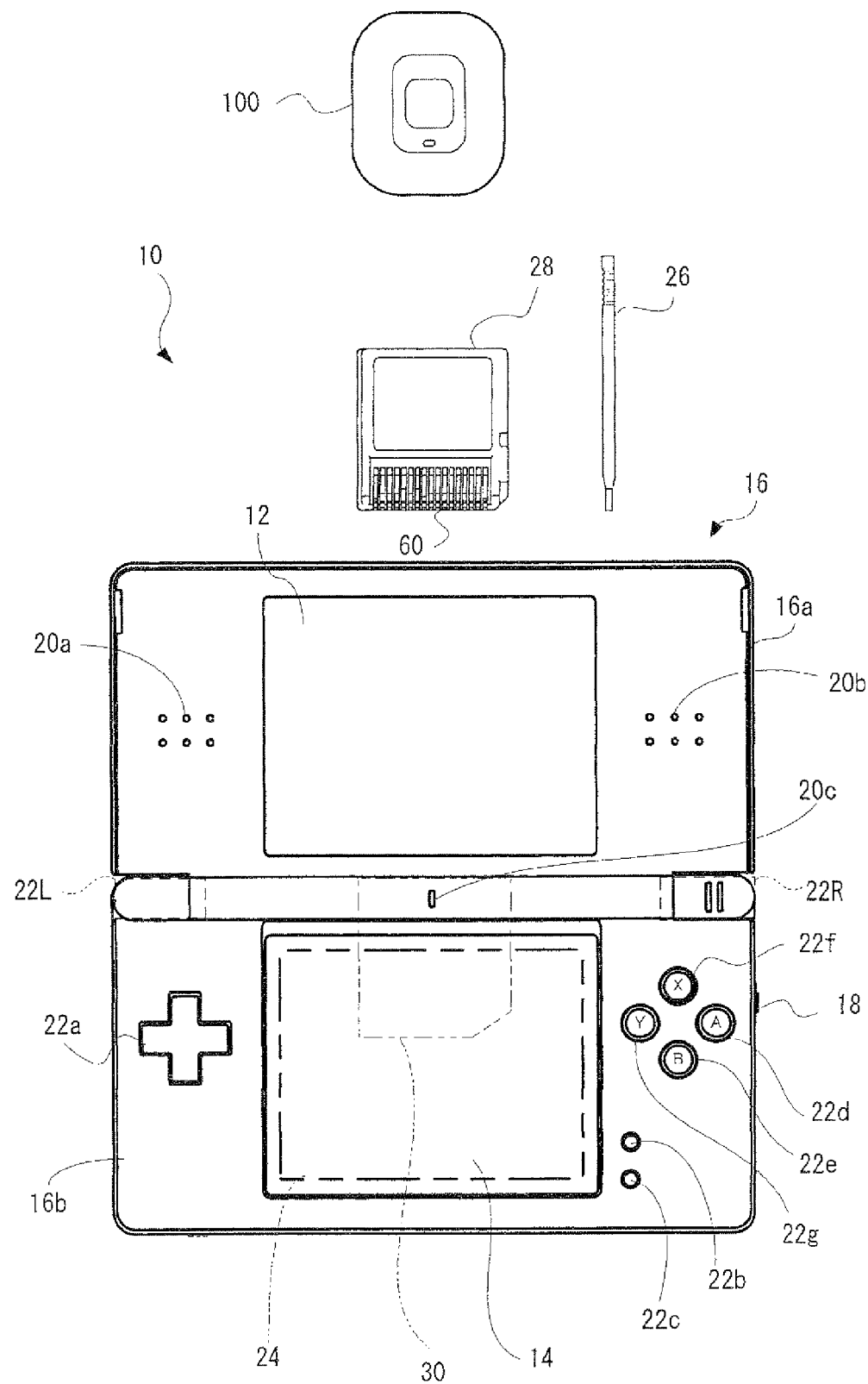
FIG. 1 is an illustrative view showing a step count measuring system of one embodiment of the present invention.

Referring to FIG. 1, a step count measuring system 1000 of an embodiment of the present invention includes a pedometer 100 and a step count managing apparatus 10. The pedometer 100 is for counting a step count according to walking by a user. The step count managing apparatus 10 is for managing step count data counted by the pedometer 100. The step count managing apparatus 10 and the pedometer 100 send and receive data by a short distance wireless communication, such as IrDA, for example.

In FIG. 1, only one pedometer 100 is shown, but the step count measuring system 1000 may include a plurality of pedometers 100. That is, in the step count managing apparatus 10, step count data of each of the plurality of pedometers 100 may be managed.

The step count managing apparatus 10 is implemented as a form of a hand-held-typed game apparatus as one example. Here, the form of the step count managing apparatus 10 is arbitrary, and may be a console-typed game apparatus, a personal computer, a mobile information terminal, a cellular phone, etc.

The game apparatus 10 includes a first liquid crystal display (LCD) 12 and a second LCD 14. The LCD 12 and the LCD 14 are set on a housing 16 so as to be arranged in predetermined positions. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape and a size approximately the same as those of the upper housing 16a, and has an opening formed so as to expose a display surface of the LCD 14 at an approximately center of the horizontal direction. Also, a power switch 18 is provided at the right side surface of the lower housing 16b.

Furthermore, the upper housing 16a is provided with sound release holes 20a and 20b for speakers 36a and 36b (see FIG. 2) on both sides of the LCD 12.

The upper housing 16a and the lower housing 16b are rotatably connected, at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

Then, a microphone hole 20c for a microphone (not illustrated) is formed at the center of the connected portion between the upper housing 16a and the lower housing 16b. This makes it possible to perform game processing on the basis of a sound signal by a sound, a voice, a breath, or the like taken from the microphone.

Furthermore, the lower housing 16b is provided with an operating switch 22 (22a, 22b, 22c, 22d, 22e, 22f, 22g, 22L and 22R).

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. The other switches 22b-22g are arranged at the right of the LCD 14 on the one surface of the lower housing 16b. In addition, the operating switches 22L and 22R are arranged at the right and left corners on the upper side surface of the lower housing 16b. It should be noted that action switches 22L and 22R are provided on a back surface of the lower housing 16b, and shown by dotted line because they are hidden under the connected portion in a front view as shown in FIG. 1.

The direction instructing switch 22a functions as a digital joystick, and is utilized for instructing a traveling direction (moving direction) of a player object (or player character) to be operated by a user or a player and instructing a traveling direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player object to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the operations similar to the A button 22d and B button 22e. Of course, the X button 22f and the Y button 22g are not necessarily utilized in the game play.

The action switch (left depression button) 22L and the action switch (right depression button) 22R are formed by the push buttons, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles.

Also, on a top surface of the LCD 14, a touch panel 24 is provided. As the touch panel 24, any kinds of a resistance film system, an optical system (infrared rays system) and an electrostatic capacitive coupling system, for example, can be utilized. The touch panel 24 is a pointing device for designating an arbitrary position (coordinates) within the screen of the LCD 14 by the user. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects coordinates of an operated position by the stick 26, etc. to output coordinates data corresponding to the detected coordinates.

It should be noted that in this embodiment, a resolution of the display surface of the LCD 14 (the same is true for the LCD 12) is 256 dots×192 dots. A detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, characters such as, a player object, etc. are displayed on the one LCD, and items belonging to the player object may be displayed on the other LCD. Additionally, a game screen including a player object and a non-player object, etc. may be displayed on the one LCD, and a game screen including information relating to the player object and the non-player object or an operation screen for operating the player object can be displayed on the other LCD. Furthermore, by utilizing the two LCD 12 and LCD 14 as one screen, it is possible to display a large monster (enemy object) to be defeated by the player object.

Accordingly, the player is able to point (operate) an image such as a player object, an enemy object, an item object, an operating object, etc. to be displayed on the screen of the LCD 14 and select (input) commands by operating the touch panel 24 with the use of the stick 26, etc. Also, it is possible to change the direction of a virtual camera (viewpoint) (direction of the line of sight) provided in the virtual game space (three-dimensional game space), and instruct a scrolling (gradual moving display) direction of the game screen (map).

Additionally, depending on the kind of the game, other input instructions can be made with the use of the touch panel 24. For example, it is possible to input by hand texts, numbers, symbols, etc. on the LCD 14 of the touch panel 24.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

Although the first LCD 12 and the second LCD 14 are vertically arranged, the arrangement of the two LCDs may be changed as necessary. In another embodiment, the first LCD 12 and the second LCD 14 may horizontally be arranged.

Furthermore, in this embodiment, two LCDs are provided, but the number of LCDs as a display means can be changed as necessary. In another embodiment, a vertically-long LCD is provided, and by vertically dividing the display areas into two, two game screens may be displayed on the respective display areas, or a horizontally-long LCD is provided, and by horizontally dividing the display area side by side, two game screens may be displayed on the respective display areas.

In addition, the stick 26 can be housed in the housing portion (not shown) provided on the lower housing 16b, for example, and taken out as necessary. However, if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on an upper edge surface of the lower housing 16b. Although omitted in FIG. 1, a connector 32 (see FIG. 2) is provided at a depth portion of the loading slot 30 for connecting a connector 60 provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

Furthermore, although omitted in FIG. 1, a battery accommodating box is provided on a rear surface of the lower housing 16b, a volume switch, an earphone jack, etc. are provided on the lower edge surface (bottom surface) of the lower housing 16b, and an external expansion connector is provided on the upper edge surface (top surface), for example.

FIG. 2 is a block diagram showing an electrical configuration of the game apparatus 10. Referring to FIG. 2, the game apparatus 10 includes an electronic circuit board 38, and on the electronic circuit board 38, circuit components, such as a CPU core 34, etc. are mounted. The CPU core 34 is connected to the above-described connector 32 via a bus 40, and is connected with a RAM 42, a first graphics processing unit (GPU) 44, a second GPU 46, an input-output interface circuit (hereinafter, referred to as "I/F circuit") 48, an LCD controller 50, and a wireless communication portion 58.

The connector 32 is detachably connected with the memory card 28 as described above. The memory card 28 includes a connector 60 to be connected to the connector 32, and the connector 60 is connected with a ROM 64 and a microcomputer 66 via a bus 62. The microcomputer 66 is connected with a backup memory 68 and an Ir communication circuit 70.

The microcomputer 66 controls writing and reading the backup memory 68 under the control of the CPU core 34, and controls an infrared rays communication (Ir communication) by utilizing the Ir communication circuit 70. That is, the CPU core 34 writes and reads data to and from the backup memory 68 via the microcomputer 66. Furthermore, the CPU core 34 transmits and receives data with a pedometer 100 via the microcomputer 66 and the Ir communication circuit 70. Here, although not seen in FIG. 1, a communication port of the Ir communication circuit 70 is provided at a position (on the top surface, for example) exposed when the memory card 28 is loaded into the loading slot 30.

The ROM 64 stores in advance a game program for a game to be executed by the game apparatus 10, image data (text and object image, background image, item image, icon (button) image, message image, etc.), data of the sound (music) necessary for the game (sound data), etc. The backup memory 68 stores (saves) proceeding data of the game, result data of the game, etc. As a backup memory 68, a nonvolatile memory, such as a flash memory, an SRAM to which power is supplied from a battery, etc. can be used.

The RAM 42 is utilized as a buffer memory or a working memory. That is, the CPU core 34 loads the game program, the image data, the sound data, etc. stored in the ROM 64 of the memory card 28 into the RAM 42, and executes processing according to the loaded game program. Furthermore, the CPU core 34 executes a game process while storing data (game data, flag data, etc) temporarily generated or obtained in correspondence to a progress of the game in the RAM 42.

Each of the GPU 44 and the GPU 46 forms a part of a rendering means, is constructed by, for example, a single chip ASIC, and receives a graphics command (drawing instruction) from, the CPU core 34 to generate image data according to the graphics command. It should be noted that the CPU core 34 applies an image generation program, (included in the game program) required to generate the image data to both of the GPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: polygon data, texture data, etc.) to execute a graphics command.

In addition, the CPU core 34 writes image data necessary for drawing to the first VRAM 52 and the second VRAM 54 via the GPU 44 and the GPU 46. The GPU 44 accesses the VRAM 52 to produce image data necessary for drawing and stores the same in a rendering buffer of the VRAM 52. The GPU 46 accesses the VRAM 54 to produce image data for drawing and stores the same in the rendering buffer of the VRAM 54. As a rendering buffer, a frame buffer, a line buffer, etc. may be adopted.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data produced by the GPU 44 to the LCD 12, and outputs the image data produced by the GPU 46 to the LCD 14 in a case that the data value of the register 56 is "0". Additionally, the LCD controller 50 outputs the image data produced by the GPU 44 to the LCD 14, and outputs the image data produced by the GPU 46 to the LCD 12 in a case that the data value of the register 56 is "1".

Furthermore, the LCD controller 50 can directly read the image data from the VRAM 52 and the VRAM 54, or read the image data from, the VRAM 52 and the VRAM 54 via the GPU 44 and the GPU 46.

In addition, the VRAM 52 and the VRAM 54 may be provided in the RAM 42, or a rendering buffer and a Z buffer therefor may be provided in the RAM 42.

The I/F circuit 48 is connected with the operating switch 22, the touch panel 24 and the speakers 36a, 36b. Here, the operating switch 22 is the above-described switches 22a, 22b, 22c, 22d, 22e, 22f, 22g, 22L and 22R, and in response to an operation of the operating switch 22, a corresponding operation, signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36a, 36b via the I/F circuit 48.

The wireless communication portion 58 is a communication means for transmitting and receiving data with another game apparatus 10 or communication equipment in a wireless manner. Here, the weak radio wave transmitted and received by the game apparatus 10 is set in intensity to such a degree as not to be restricted by the Radio Law. When the CPU core 34 applies data such as game data, a command, etc. to the wireless communication portion 58, the wireless communication portion 58 modulates data to be transmitted to the opponent into a wireless signal and transmits it from an antenna. Furthermore, the wireless communication portion 58 receives a wireless signal from the opponent by the antenna to demodulate it to data, and applies the data to the CPU core 34. Via the wireless communication portion 58, the game apparatus 10 can receive and transmit data with, other game apparatuses 10 to thereby execute a communication game. The game apparatus 10 can connect to a network via the wireless communication portion 58, and thus can download a program and data from a server on the network, upload data to the server, communicate with another game apparatus 10 via the network.

Figure 3:
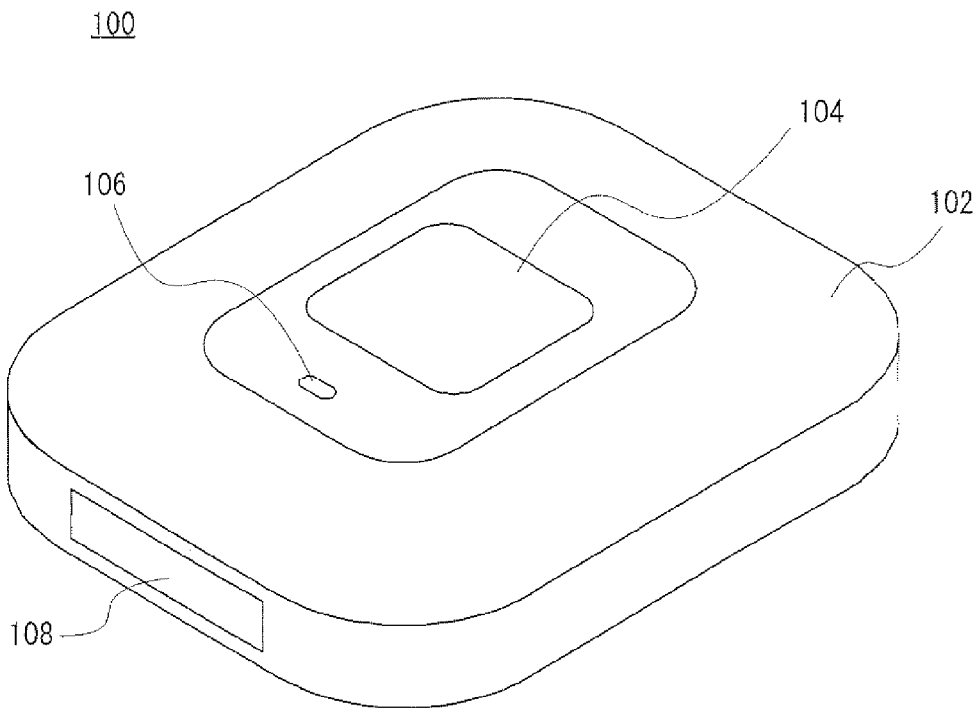
FIG. 3 is a perspective view showing one example of an appearance of a pedometer.

FIG. 3 shows a perspective view showing one example of the pedometer 100. The pedometer 100 has a housing 102 in a roughly rectangular parallelepiped shape, and the housing 102 is made small enough to be put in a pocket, etc. of the user, and has lengths longitudinally and transversely in the order of 3 to 4 cm, and a thickness of the order of 1 cm as one example. The housing 102 is provided with a push button 104 on one main surface (top surface). In a case that the Ir communication circuit 70 of the memory card 28 is in a communication standby state, when the push button 104 is pushed by the user, the pedometer 100 starts to communicate with the memory card 28, that is, the game apparatus 10. Furthermore, at the end of the push button 104, an LED 106 is provided. The LED 106 is two-color LED, for example, and represents an operating condition of the pedometer 100 by a color, a flashing pattern. Furthermore, on the side surface (tip-end surface) of the housing 102, an infrared communication port 108 is provided. Additionally, as an operating power source of the pedometer 100, a coin shaped lithium cell (CR2032) is used, for example, and on the other main surface (bottom surface) of the housing 102, a battery cover is detachably provided.

Figure 4:
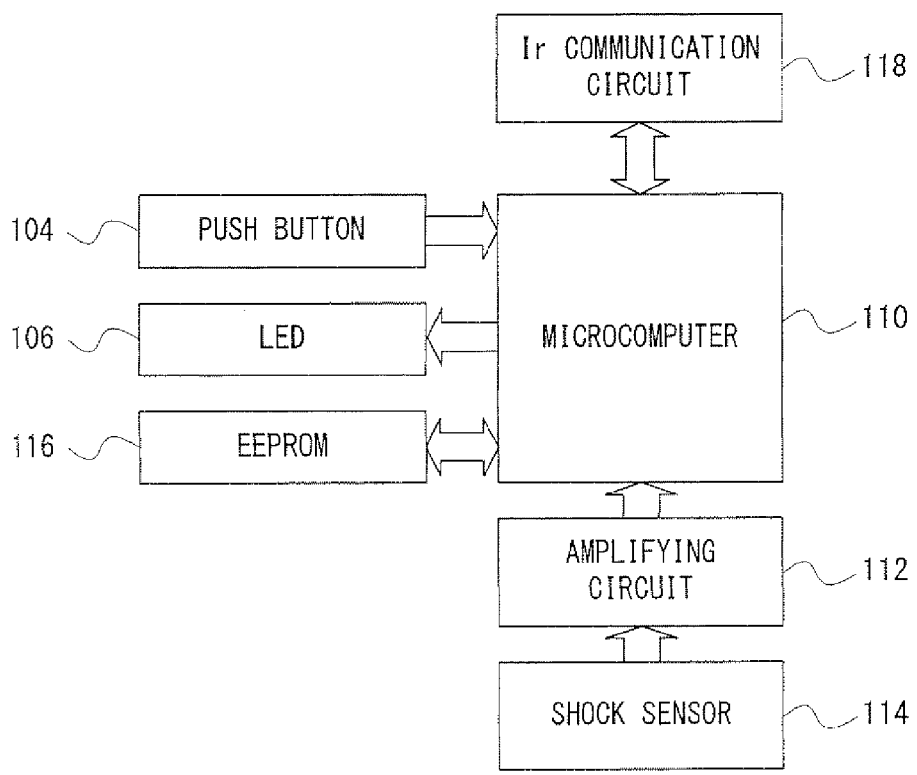
FIG. 4 is a block diagram showing one example of an electric configuration of the pedometer.

FIG. 4 is a block diagram showing one example of an electric configuration of the pedometer 100. The pedometer 100 includes a microcomputer 110, and the microcomputer 110 is connected with a shock sensor 114 via an amplifying circuit 112. Furthermore, the microcomputer 110 is connected with the push button 104, the LED 106, an EEPROM 116 and an Ir communication circuit 118.

The microcomputer 110 is a low power consumption microcomputer integrated with a step counter algorithm, and controls an entire operation of the pedometer 100, such as detection of output data from the shock sensor 114, writing to and reading data from the EEPROM 116, flashing of the LED 106, and an infrared rays communication by utilizing the Ir communication circuit 118, etc.

The shock sensor 114 is a sensor for detecting a motion according to walking by the user, and is applied with a shock sensor (acceleration sensor) used for an impact detection of an HDD. The shock sensor 114 is arranged in two-axis directions in this embodiment, and this makes it possible for the user to count or detect a step count (the number of steps) with the pedometer 100 in the pocket, the bag, etc. The output from the shock sensor 114 is amplified by the amplifying circuit 112 and then input to the microcomputer 110. Since the microcomputer 110 contains an AD converter, the microcomputer 110 performs a sampling on the output from the shock sensor 114 to acquire output data (acceleration data). The microcomputer 110 counts the step count on the basis of the output data and the step counter algorithm, and sequentially stores an accumulated value (the number of counts) of the step count per unit of time in the EEPROM 116. That is, the EEPROM 116 stores a historical record of step count values per unit of time as step count data.

Here, there is a limit to the storage area for the step count data in the EEPROM 116, that is, the step count data has a retention period. For example, in a case that a step count value is stored every minute, the EEPROM 116 can store about seven day's historical records of the step counts. In a case that the storage area becomes full, the oldest-stored step count value is overwritten. Furthermore, in this embodiment, the unit of time for recording the step count value is set to one minute, but this may be changed to one hour, one day, etc., for example, as necessary.

The microcomputer 110 controls the color and the flashing pattern of the LED 106 depending on the operating condition or state. For example, in a case that the number of steps on that day is above the step count set in advance, the color of the LED 106 is changed from red to yellow green. Furthermore, when the push button 104 is pushed, the microcomputer 110 starts a communication with the game apparatus 10 (memory card 28) by utilizing the Ir communication circuit 118, and blinks the LED 106 for confirming the start of the communication and checking the operation.

When the push button 104 is pushed to start a communication, the microcomputer 110 reads an ID (identification information) of the pedometer 100 from an internal ROM or the EEPROM 116, and transmits the data including the ID to the game apparatus 10 through the Ir communication circuit 118. The pedometer 100 and the game apparatus 10 transmits and receives necessary data. Then, when receiving a request of step count data from the game apparatus 10, the microcomputer 110 reads necessary step count data from the EEPROM 116 and transmits the same to the game apparatus 10. Here, the game apparatus 10 can store the date and time information when the step count data is previously received from the pedometer 100, and can request the step count value for a necessary time or the necessary number of count values, so that the microcomputer 110 can read the step count value for a necessary time or the necessary number of count values as far back as the past from the current step count value, and transmit the same to the game apparatus 10.

Figure 5:
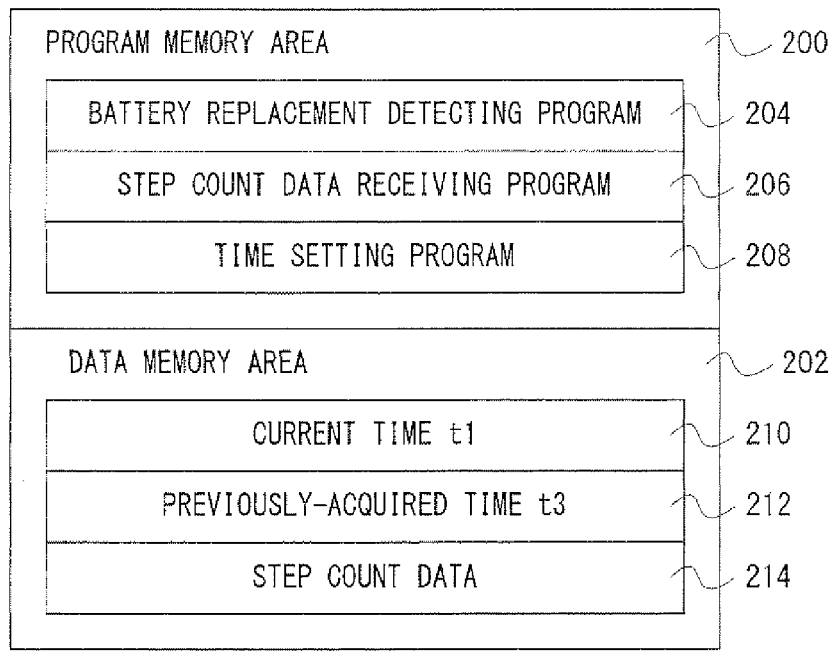
FIG. 5 is an illustrative view showing one example of a memory map of the game apparatus.

FIG. 5 shows one example of a memory map of the game apparatus 10. The memory map includes a program memory area 200 and a data memory area 202. FIG. 5 shows a part of the memory map, and the program memory area 200 and the data memory area 202 also store other programs and data necessary for processing, such as an image generating and displaying program, an operation data acquiring program, a step count data storing program, a program and image data for utilizing the step count data in predetermined processing.

A memory area 204 stores a battery replacement detecting program. This program is for detecting whether or not a replacement of a battery is performed in the pedometer 100. This also detects an erroneous reset of the pedometer 100 due to a strong impact, such as static electricity applied to the pedometer 100 as well as the replacement of the battery. That is, according to this program, whether or not initialization is executed in the pedometer 100 is determined. Whether or not initialization is executed is determined on the basis of predetermined, data acquired by the pedometer 100. When, the pedometer 100 is reset, that is, when initialization processing is executed, information indicating that the initialization is executed may be stored as predetermined data. In this case, initialization is determined by this information. Furthermore, this may be determined, on the basis of the number of step count values stored in the pedometer 100. In this case, a previously-acquired time indicating the time information when the step count data is acquired from the pedometer 100 is stored in the game apparatus 10. Then, when the number of step counts which is stored in the pedometer 100 from the previously-acquired time to the current time is smaller than the number of step counts to be stored during this period, it is found that initialization is executed.

A memory area 206 stores a step count data receiving program. This program is for acquiring a necessary step count value from the pedometer 100. Thus, the step count data from the previously-acquired time to the current time is acquired. Furthermore, in a case that initialization is executed, the step count data before the initialization is acquired.

A memory area 208 stores a time setting program. This program is for setting a recording time with respect to each of the step count values for each unit of time. With respect to each of the step count values stored before initialization, each recording time is set on the basis of the time of the pedometer 100. With respect to each of the step count values stored after the initialization, each recording time is set on the basis of the time of the game apparatus 10.

A memory area 210 stores a current time t1 indicating current time information of the game apparatus 10. The time information includes month and year, and date and time. The electronic circuit board, of the game apparatus 10 is provided with a time circuit not shown, and the CPU core 34 acquires a time from the time circuit to count a current time t1.

A memory area 212 stores a previously-acquired time t3. The previously-acquired time t3 is time information when the previous step count data is acquired from the pedometer 100, that is, time information when step count data acquiring processing is performed last to receive step count data. In a case that the game apparatus 10 acquires step count data from the plurality of pedometers 100, each t3 is stored by bringing it into correspondence to an ID of each of the pedometers 100. The previously-acquired time t3 is stored in the backup memory 68.

A memory area 214 stores step count data acquired from the pedometer 100. In a case that the game apparatus 10 acquires step count data from the plurality of pedometers 100, each step count data is stored by bringing it into correspondence to an ID of each f the pedometers 100. The step count data is stored in the backup memory 68.

Figure 6:
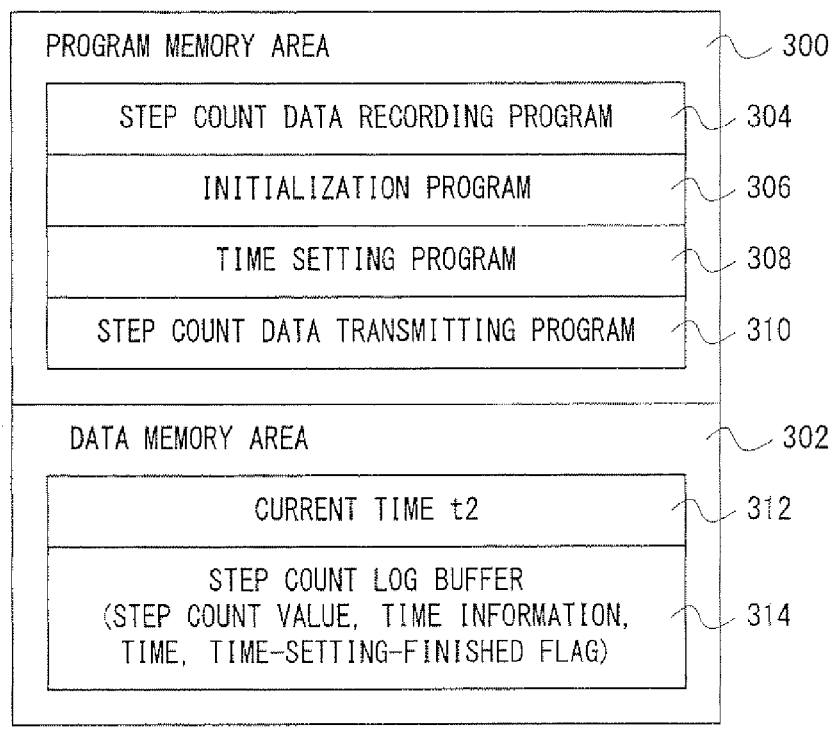
FIG. 6 is an illustrative view showing one example of a memory map of the pedometer.

FIG. 6 shows one example of a memory map of the pedometer 100. The memory map includes a program memory area 300 and a data memory area 302. Additionally, FIG. 6 shows a part of the memory map, but the program memory area 300 and the data memory area 302 store other programs and data necessary for execution of the processing.

A memory area 304 stores a step count data recording program. This program is for detecting and recording a step count value per unit of time.

A memory area 306 stores an initialization program. This initialization program is executed in response to a pedometer being reset due to a replacement of the battery, etc. In this initialization processing, when it is determined that the step count data which is being counted is stored, the data is stored as past data, that is, data counted before the initialization.

A memory area 308 stores a time setting program. This program is for setting a time of the pedometer 100 to a time of the game apparatus 10.

A memory area 310 stores a step count data transmitting program. This program is for transmitting a necessary step count value to the game apparatus 10.

A memory area 312 stores a current time t2 indicating current time information of the pedometer 100. The time information includes years, months, dates, seconds and minutes. The microcomputer 110 of the pedometer 100 includes a time circuit for counting the current time t2. The current time t2 is reset to an initial value when initialization is executed. The initial value is "2001/01/01 00:00:00", for example. Furthermore, when the current time is set by the time setting program of the memory area 308, the current time t2 is set to the current time received from the game apparatus 10.

A memory area 314 is a step count log buffer, that is, a step count data buffer. This step count log buffer is provided to a specific range of the EEPROM 116, and therefore, even if the battery is run out, the data is saved. This buffer stores step count logs, that is, step count values per unit of time. Other than the step count data, in addition, date and time data, such as (detected) time information corresponding to at least one step count value, and the time-setting-finished flag is also stored. The time-setting-finished flag shows whether or not the time of the pedometer 100 is counted on the basis of the time received from the game apparatus 10.

Referring to FIG. 7-FIG. 9, a step count data recording method according to this embodiment is explained. In the pedometer 100, date and times, and step counts are stored, so as to be mixed in the step count log buffer 314 provided to the EEPROM 116. That is, a step count buffer and a date and time buffer are not separately provided. This is if a specific memory area is fixed as a date and time buffer, this memory area is rewritten for each unit of time, and such a recording method causes a problem of rewriting life of the EEPROM. Thus, in this embodiment, by movably writing the step count data and the date and time data. It is possible to prevent a rewriting life of the memory from being shortened.

More specifically, in the step count log buffer 314, a currently-effective date block is produced, and in the currently-effective date block, time information in relation, to currently-measuring step count data is stored. FIG. 7 is an illustrative view explaining the currently-effective date block. In FIG. 7, a black rhombus mark "◆" 400 indicates a currently-effective date block. Furthermore, a double circle mark "◎" 402 indicates a memory area for a step count value indicated by the date block, and a star mark "*" 404 indicates a memory area for one step count value.

The currently-effective date block "◆" 400 indicates a detecting time of the step count value surely stored earlier by a predetermined length. That is, the time information stored in the currently-effective date block "◆" 400 indicates a recording time of a step count value earlier by the predetermined length, that is, the detecting time of the step count value stored in the memory area of the double circle "◎" 402. First, regarding the head of the step count log buffer 314 as a reference, at the address after the predetermined length, the currently-effective date block "◆" 400 is produced, and in this currently-effective date block "◆" 400, the time of the pedometer 100 is stored. Furthermore, the time-setting-finished flag for indicating whether or not the time of the pedometer 100 is a time set on the basis of the time of the game apparatus 10 is also stored. The step count value detected for each predetermined unit of time is sequentially stored from the memory area "◎" 402 at the head of the step count log buffer 314. Thus, in the step count log buffer 314, the time information is stored by being brought into association with the step count value sequentially detected and stored for each unit of time.

When the step count values are sequentially stored in the memory area "*" 404 with the lapse of time to thereby make the writing position close up the currently-effective date block "◆" 400, the currently-effective date block "◆" 400 is moved. FIG. 8 is an illustrative view explaining a movement of the currently-effective date block. In FIG. 8, the circle mark "○" 406 represents a memory area in which the step count value has already been stored. Furthermore, the up arrow 408 indicates a writing position designated by a writing pointer, that is, a memory area or a storing position to which, a next step count value is to be written.

As shown in an upper part of FIG. 8 in this embodiment, when the writing position 408 indicates the currently-effective date block "◆" 400, the currently-effective date block is moved. More specifically, as shown in a lower part of FIG. 8, the currently-effective date block is moved by a predetermined length ahead of the writing position 408, and in the moved currently-effective date block "◆" 400, the time and the time-setting-finished flag of the pedometer 100 are stored. Accordingly, the memory area pointed by the writing pointer (writing position. 408), that is, the memory area ("◆" 400 at the upper part of FIG. 8) which has been the currently-effective date block by then becomes the memory area "◎" 402 (at the lower part of FIG. 8) indicated by the date block, and in this area 402, the detected step count value is to be stored. The memory area (at the upper part of FIG. 8) which has been the memory area "◎" 402 of the step count value indicated by the date block by then becomes a memory area "○" 406 (at the lower part of FIG. 8) in which the step count has already been stored.

In this manner, in the step count log buffer 314, the step count values are stored while the currently-effective date block "◆" 400 is moved. Furthermore, if the respective step count values are stored in a manner that a detecting order can be known, by storing only the time corresponding to at least one step count, it is possible to calculate the time of each step count value. That is, since the time information of the step count value stored earlier by the predetermined length in the memory area "☉" 402 is stored in the currently-effective date block "◆" 400, and each step count value sequentially detected for each unit of time is stored in an address order, it is possible to calculate the time of each of the step count values on the basis of the time information of the currently-effective date block "◆" 400 and the address order. Accordingly, there is no need of storing a time for each step count value, and it is only necessary to store at least one time in association with the step count value which is sequentially detected and stored, and therefore, it is possible to save the capacity of the memory for storing the step count data.

Additionally, the step count log buffer 314 is configured as a ring buffer, and a memory area to be written to the next to the end of the memory area of the step count log buffer 314 is the head of the step count log buffer 314. Thus, when recording the step count values reaches the end of the memory area of the step count log buffer 314, the next recording is continued from the head of the step count log buffer 314 by overwriting.

When battery exhaustion occurs in the pedometer 100, recording the step count values is stopped. The step count log buffer 314 is held at a storing state directly before the battery exhaustion. Then, when a battery is replaced by the user, the microcomputer 110 of the pedometer 100 is reset to execute initialization processing. By the initialization processing started in response to this reset, the times being associated with the step count values which have been stored in the step count log buffer 314 is stored, as data distinguishable from the time being association with step count values which are to be stored in the step count log buffer 314 from now.

More specifically, the initialization processing shown in FIG. 9 is executed. Assuming that the battery is run out in a state of the step count log buffer 314 shown at the upper part of FIG. 9. In the initialization processing after the replacement of the battery, the microcomputer 110 searches the step count log buffer 314 to find a currently-effective date block "◆" 400. When the currently-effective date block "◆" 400 is found, the microcomputer 110 changes the currently-effective date block "◆" 400 to the past date block. As shown in a lower part of FIG. 9, a white rhombus mark "◇" 410 indicates a past date block. Here, even if the date block is changed from the currently-effective date block to the past date block, the time and the time-setting-finished flag stored in this block are not changed. That is, the past date block "◇" 410 stores the time information of the step count value stored in the memory area "☉" 402 earlier by the predetermined length. Accordingly, the time of each of the step count values stored before the past date block "◇" 410 can be calculated on the basis of the time of the past date block "◇" 410 and the address order.

In addition, the microcomputer 110 newly produces a currently-effective date block "◆" 400 by regarding the address directly after the past date block "◇" 410 as a reference. That is, the currently-effective date block "◆" 400 is produced later by the predetermined length from the memory area directly after the past date block "◇" 410. Accordingly, the memory area directly after the past date block "◇" 410 is the memory area earlier by the predetermined length than the currently-effective date block "◆" 400, that is, becomes the memory area "☉" 402 for the step count indicated, by the currently-effective date block "◆" 400. Here, in the currently-effective date block "◆" 400, the time of the pedometer 100 which is reset to the initial value is stored, and the time-setting-finished flag corresponding to the time is turned off. Furthermore, the writing position 408 by the writing pointer is changed to the address directly after the past date block "◇" 410. In this manner, after the replacement of the battery, recording of the step count value is performed from directly after the past date block "◇" 410.

Here, the explanation is made by taking a case that the initialization is performed in response to the replacement of the battery after the battery exhaustion as an example, but this is true for the case that initialization is performed due to other reasons, such as an erroneous reset by an impact, such as strong static electricity, etc.

The step count data thus stored in the step count log buffer 314 of the pedometer 100 can be distinguishable between the step count logs stored before the battery exhaustion or the latest step count logs (which are currently being recorded) on the basis of the currently-effective date block and the past date block. Accordingly, with respect to each step count value of the step count logs stored before the battery exhaustion, each of the times can be calculated by the past date block, and with respect to each step count value of the latest step count logs, each of the times can be calculated by the current date block.

Figure 10:
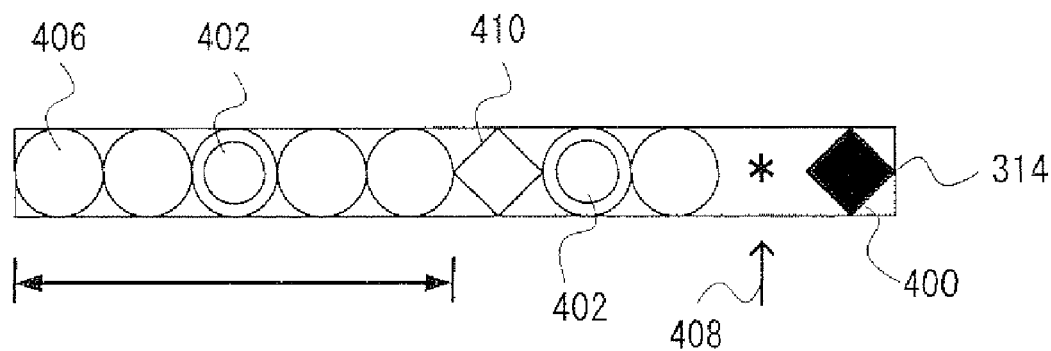
FIG. 10 is an illustrative view showing acquirement of step count logs before the battery exhaustion.

FIG. 10 shows an illustrative view showing acquisition of the step count logs before the battery exhaustion. The writing position 408 by the writing pointer is the memory area at the tip end in recording of the current step count log, and therefore, the past date block "◇" 410 or the currently-effective date block "◆" 400 are searched in a reverse direction from this writing position 408 (reverse direction to the record advancing direction). Additionally, since the step count log buffer 314 is a ring buffer as described above, when the search is performed to the head of the step count log buffer 314, the search is continuously performed from the end thereof. Furthermore, in a case that there is no step count log before the battery exhaustion, the currently-effective date block "◆" 400 is found without the past date block "◇" 410 being found. Here, the reason why the past date block "◇" 410 is not found is that the replacement of the battery is not performed, or battery exhaustion does not occur within the storing period of the step count logs, and the past date block "◇" 410 is overwritten.

In a case that step count logs earlier than the battery exhaustion directly before (that is, once before) are acquired, a first past date block "◇" 410 in the reverse direction from the writing position 408 is searched. In a case that the past date block "◇" 410 is found, another past date block "◇" 410 or the currently-effective date block "◆" 400 is searched in the reverse direction from there. The data from the first past date block to the date block next found are acquired as step count data earlier than the battery exhaustion directly before. In a case of FIG. 10, the past date block "◇" 410 next three from the writing position 408 to the left is found as a first past date block by the search. In addition, the currently-effective date block "◆" 400 at the tail end of the step count log buffer 314 is found. Then, the step count data between them, are acquired as step count logs earlier than the battery exhaustion once before.

The acquisition of step count logs earlier than the battery exhaustion twice before and the step count logs further before are also acquired similarly.

In the general of terms as to the acquisition of the step count logs earlier than the battery exhaustion, when step count logs (n+1)-times before are acquired, the (n+1)th past date block "◇" 410 from the writing position 408 in the reverse direction is searched. Here, n is a variable for counting the number of replacements of the battery, and is an integer equal to or more than 0. In a case that the (n+1)th past date block "◇" 410 is found, another past date block "◇" 410 or the currently-effective date block "◆" 400 is further searched from there in the reverse direction, and the data between them are acquired as step count logs earlier than the battery exhaustion (n+1)-times before.

Figure 11:
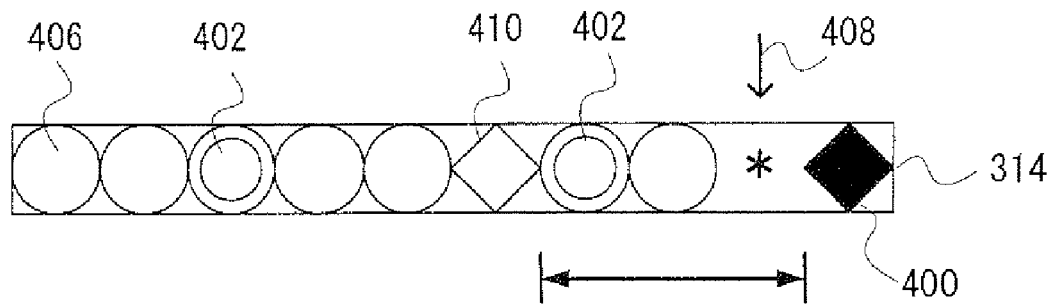
FIG. 11 is an illustrative view showing acquirement of the latest step count logs.

FIG. 11 shows an illustrative view explaining acquisition of latest step count logs. When the latest step count logs are acquired, a past date block "◊" 410 or a currently-effective date block "♦" 400 is searched from the writing position 408 in the reverse direction (reverse direction to the record advancing direction). The step count data from the writing position 408 to the found date block are acquired as latest step count logs. In a case of FIG. 11, a past date block "◊" 410 next three from the writing position 408 to the left is found. Then, the step count data between the writing position 408 and the found past date block "◊" 410 are acquired as latest step count logs.

A time is set to each of the step count values of the step count logs. With respect to the step count logs before the battery exhaustion, the setting is made on the basis of the time counted by the pedometer 100 and stored in the past date block "◊" 410. More specifically, the time of each f step count values is calculated from the past date block "◊" 410 after the step count log and the memory area "⊙" 402 earlier by the predetermined length than the past date block "◊" 410. That is, the time of the step count value of the memory area "⊙" 402 indicated by the date block is the time stored in the past date block "◊" 410, and therefore, the times of the other step count values of the step count logs are set on the basis of their address and a unit of time (one minute in this embodiment) for recording. With respect to the step count values stored before the memory area "⊙" 402 indicated by the past date block "◊" 410, a time obtained, by subtracting the unit of time from the time of the memory area "⊙" 402 every decrease in address from the memory area "⊙" 402 is set, and with respect to the step count values stored after the memory area "⊙" 402, a time obtained by adding the unit of time to the time of the memory area "⊙" 402 every increase in address from the memory area "⊙" 402 is set. For example, the time of the step count value of the memory area "○" 406 earlier by two than the memory area "⊙" 402 designated by the date block is set to the time obtained by subtracting (unit of time×2) from the time stored in the past date block "◊" 410.

Furthermore, with respect to the latest step count logs, the time of each of the step count values is not set on the basis of the time stored in the currently-effective date block "♦" 400, but the time counted by the game apparatus (step count managing apparatus) 10. More specifically, the step count value stored in the memory area "○" 406 earlier by one than the writing position 408 is the latest step count values, and therefore, the time of the step count value is set to the time when the step count log is received, that is, the current time t1 stored in the game apparatus 10. The times of the other step count values of the step count logs are set on the basis of their addresses and the unit of time for recording. That is, the other step count values are stored before the latest step count value, and therefore, the time is set to a time obtained by subtracting the unit of time from the current time t1 every decrease in address.

In this manner, the times of the step count values stored after the replacement of the battery can be set by the time on the side of the game apparatus 10, and the times of the step count values recorded until the battery exhaustion in the pedometer 100 can be set by the time on the side of the pedometer 100. That is, with respect to the step count values being successive to the time which is being counted by the pedometer 100, that is, with respect to the latest step count values, the time can be set on the basis of the time of the game apparatus 10 while with respect to the step count values not being successive to the time which is being counted by the pedometer 100, that is, the step count values before the initialization, the time can be set on the basis of the time stored in the pedometer 100. Accordingly, the time of the step count value can appropriately be set depending on the presence or absence of the initialization (replacement of the battery, etc.), capable of improving accuracy of a recording time of each of the step counts.

Furthermore, if acquisition of the step count data from the pedometer 100 is intended to be performed diligently, the amount of the step count values whose time is set on the basis of the time of the pedometer 100 can be reduced, and the amount of the step count values whose time is set by the time with high accuracy of the game apparatus 10 can be increased, resulting in less care about the accuracy of the time of the pedometer 100, and capable of providing a cheap pedometer 100. Here, the pedometer 100 stops the clock in response to the battery exhaustion, and even if it then starts the clock after the replacement of the battery, the clock is set to the initial value, and therefore in this embodiment, until the time of the game apparatus 10 is set, an accurate time is not shown. However, if a time circuit having another battery is further provided to the pedometer 100, cost problems occur.

Furthermore, if a system 1000 in which a plurality of pedometers 100 exist, and the step count values detected by the plurality of pedometers 100 are managed by one game apparatus 10 is constructed, for example, the recording times of the step count values counted by the respective pedometers 100 are set by the time counted by the game apparatus 10. This makes it possible to synchronize the times of the respective pedometers 100, and even, if the plurality of pedometers 100 count different times, this allows the times to be consistent with one another, capable of improving accuracy of the recording time of the step count values.

Figure 12:
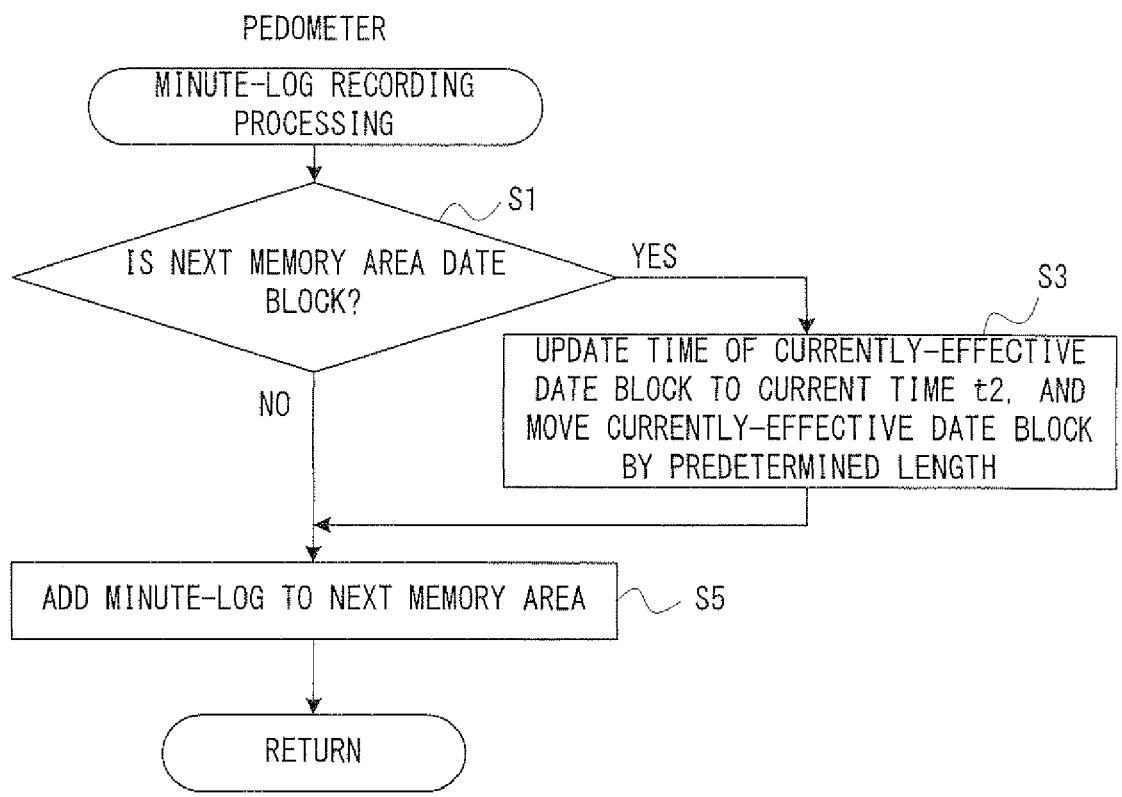
FIG. 12 is a flowchart showing one example of an operation of minute-log recording processing of the pedometer.

One example of an operation of the step count measuring system 1000 is explained on the basis of flowcharts. First, recording step count logs of the pedometer 100 is explained. FIG. 12 shows one example of an operation of a minute-log recording processing of the pedometer 100. Here, the minute-log means the step count logs in which step count values are detected by taking one minute as a unit of time. The minute-log recording processing is executed for each, unit of time (every minute in this embodiment).

In a step S1 shown in FIG. 12, the microcomputer 110 of the pedometer 100 determines whether or no a next memory area is the date block. That is, the microcomputer 110 determines whether or not the writing position indicated by the writing pointer indicates a storing position of the currently-effective date block "♦" 400 stored in the step count log buffer 314 of the EEPROM 116. If "YES" in the step S1, the microcomputer 110 changes the time of the currently-effective date block "♦" 400 to the current time t2, and moves this currently-effective date block by a predetermined length from the writing position in the step count log buffer 314 in a step S3. On the other hand, if "NO" in the step S1, the process directly proceeds to the step S3.

In the step S3, the microcomputer 110 adds the minute-log to a next memory area. That is, the microcomputer 110 stores the step count values detected or counted for the unit of time in the writing position of the writing pointer. After completion of the step S3, the minute-log recording processing is ended.

Figure 13:
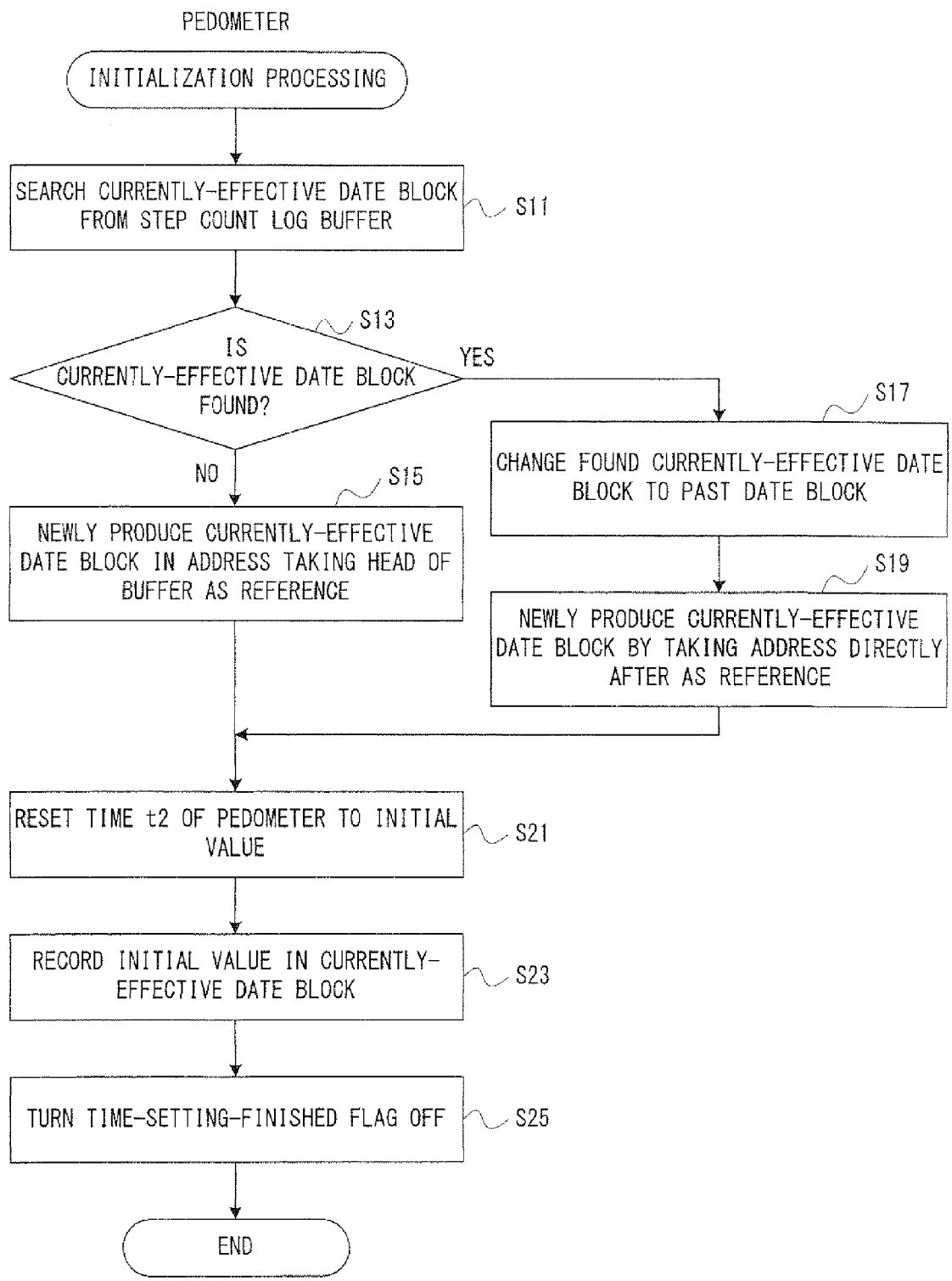
FIG. 13 is a flowchart showing one example of an operation of initialization processing of the pedometer.

FIG. 13 shows one example of an operation of initialization processing of the pedometer 100. The initialization processing is executed in response to a reset in a case that a replacement of the battery is performed, or in a case that an impact is given due to strong static electricity.

When the initialization processing is started, the microcomputer 110 first searches a currently-effective date block "◆" 400 from the step count log buffer 31.4 of the EEPROM 116 in a step S11. In a case that battery exhaustion occurs during recording the step count logs, a currently-effective date block "◆" 400 is stored in the step count log buffer 314, but in a case that initialization processing is started in the factory prior to shipment, a currently-effective date block "◆" 400 is not stored in the step count log buffer 314. Accordingly, by searching the currently-effective date block "◆" 400, it is determined whether the initialization processing is started by a replacement of the battery, a malfunction, etc or not.

Next, in a step S13, the microcomputer 110 determines whether or not the currently-effective date block "◆" 400 is found. If "NO" in the step S13, that is, if it is determined to be the first initialization processing, the microcomputer 110 newly produces a currently-effective date block "◆" 400 in an address taking the head of the buffer as a reference in a step S15. More specifically, the currently-effective date block "◆" 400 is produced ahead of the head address of the step count log buffer 314 in the EEPROM 116 by a predetermined length.

On the other hand, if "YES" in the step S13, that is, if it is determined to be the initialization processing started by a replacement of the battery and malfunction, etc., the microcomputer changes the found currently-effective date block "◆" 400 to the past date block "◇" 410 in a step S17. Furthermore, in a step S19, the microcomputer 110 newly produces a currently-effective date block "◆" 400 by taking the address directly after the past date block "◇" 410 as a reference. More specifically, the currently-effective date block "◆" 400 is produced ahead of the address directly after the past date block "◇" 410 by the predetermined length.

In a succeeding step S21, the microcomputer 110 resets the current time t2 of the pedometer 100 to the initial value. That is, a predetermined initial value is stored, in the memory area 312 as a current time t2. The current time t2 of the pedometer 100 is counted by adding a predetermine value to the initial value every unit of time.

Furthermore, in a step S23, the microcomputer 110 records the initial value, that is, the current time t2 in the currently-effective date block "◆" 400. In addition, in a step S25, the microcomputer 110 turns off the time-setting-finished flag stored in the currently-effective date block "◆" 400. The time-setting-finished flag determines whether or not the time stored in the currently-effective date block "◆" 400 is set on the basis of the time counted by the game apparatus 10. When this initialization processing is executed, the time-setting-finished flag is turned off, and when the pedometer 100 receives the current time t1 counted by the game apparatus 10 and sets the current time t1 to the current time t2 as described later, the time-setting-finished flag is turned on. The reception of the current time t1 from the game apparatus 10 is executed when a communication for transmitting step count data of the pedometer 100 to the game apparatus 10 is made. Accordingly, in a case that the time-setting-finished flag is turned off, it is found that the pedometer 100 executes initialization processing, and then is in a state that a communication with the game apparatus 10 is not made (initial state). That is, in a case that the time-setting-finished flag is turned off, initialization processing is executed in the pedometer 100 due to a replacement of the battery, a malfunction, etc., and this can show a probability that the past step count logs (step count logs before the initialization) is stored in the step count log buffer 314. After completion of step S25, the initialization processing is ended.

Figure 14:
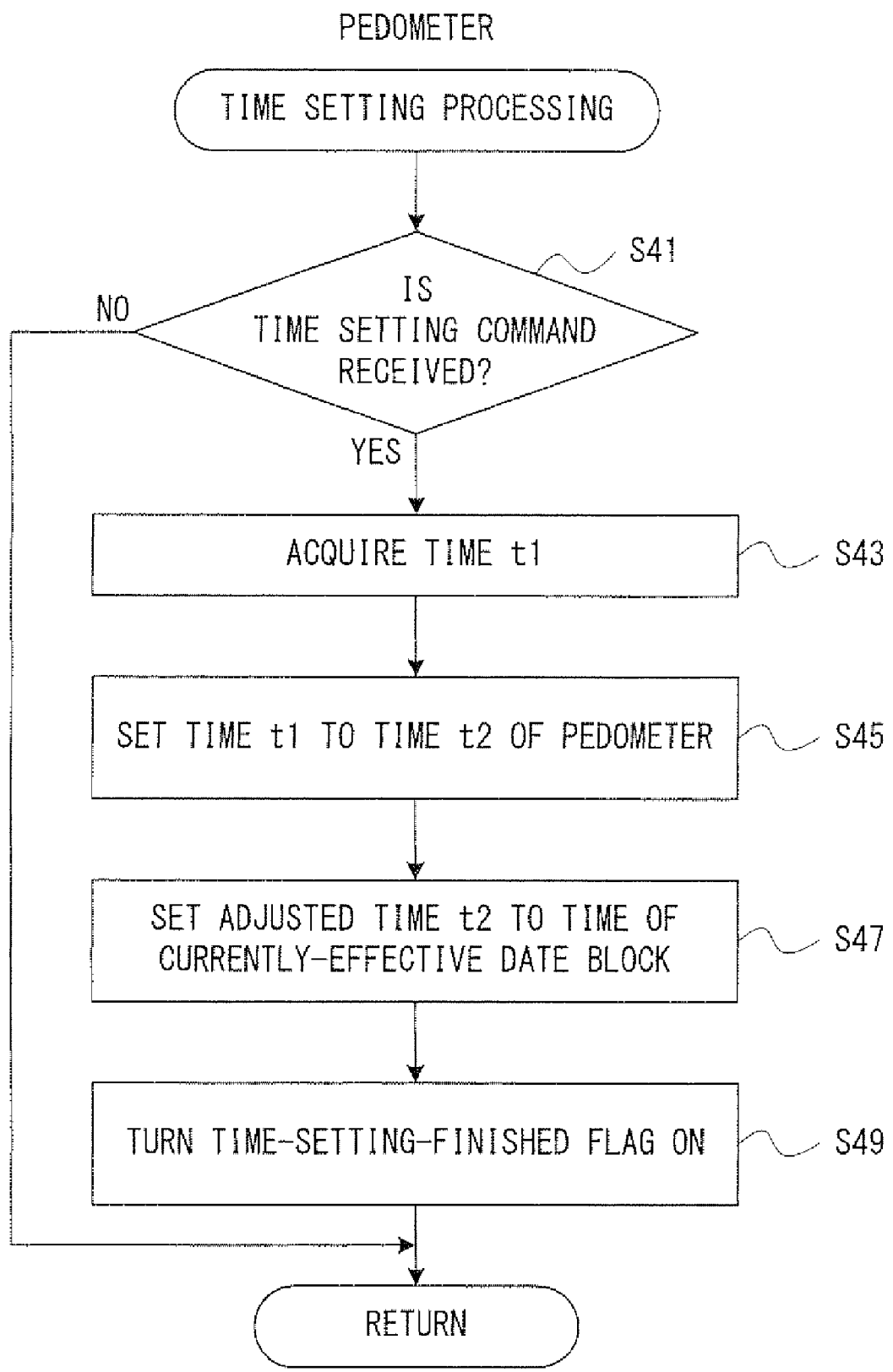
FIG. 14 is a flowchart showing one example of an operation of time setting processing of the pedometer.

FIG. 14 shows one example of an operation of time setting processing of the pedometer 100. This is executed when the pedometer 100 receives a time setting command from the game apparatus 10 while communicating with the game apparatus 10. More specifically, the microcomputer 110 of the pedometer 100 determines whether or not a time setting command is received from the game apparatus 10 in a step S41. The time setting command is transmitted from the game apparatus 10 only when the time-setting-finished flag of the pedometer 100 is turned, off as described later. The microcomputer 110 executes the processing in the step S41 every certain length of time, and if "YES" is determined, the processing in succeeding steps S43-S49 is executed. In a case that a time-setting-finished command is not received, the time setting processing is ended as it is.

In the step S43, the microcomputer 110 acquires the current time t1. Since the current time t1 counted in the game apparatus 10 is included in the time setting command, the current time t1 is extracted from the time setting command. Then, in the step S45, the microcomputer 110 sets the current time t1 to the current time t1 of the pedometer 100. More specifically, the received current time t1 is stored as the current time t2 of the memory area 312.

Successively, in the step S47, the microcomputer 110 sets the adjusted current time t2 to the time of the currently-effective date block "◆" 400. The current time t2 corresponds to the memory area at the tip end which is being recorded, that is, the writing position 408 of the writing pointer while the time of the currently-effective date block "◆" 400 corresponds to the memory area "⊙" 402 earlier by the predetermined length. Accordingly, on the basis of the current time t2, the writing position 408 and the address of the memory area "⊙" 402 earlier by the predetermined length, a detecting time of the step count value of the memory area "⊙" 402 is calculated, and the detecting time is stored in the currently-effective date block "◆" 400.

In addition, in the step S49, the microcomputer 110 turns on the time-setting-finished flag of the currently-effective date block "◆" 400. This records that the time of the currently-effective date block "◆" 400 is set on the basis of the current time t1 of the game apparatus 10. After completion of step S49, the time setting processing is ended.

Thus, since the time on the side of the pedometer 100 can be changed to the time on the side of the game apparatus 10 in this embodiment, low accuracy of the clock of the pedometer 100 may be allowed, capable of reducing the manufacturing cost of the pedometer 100. Furthermore, since this eliminates the need of the user setting the time of the pedometer 100, it is possible to simplify operability of the pedometer 100 without bothering the user.

Figure 15:
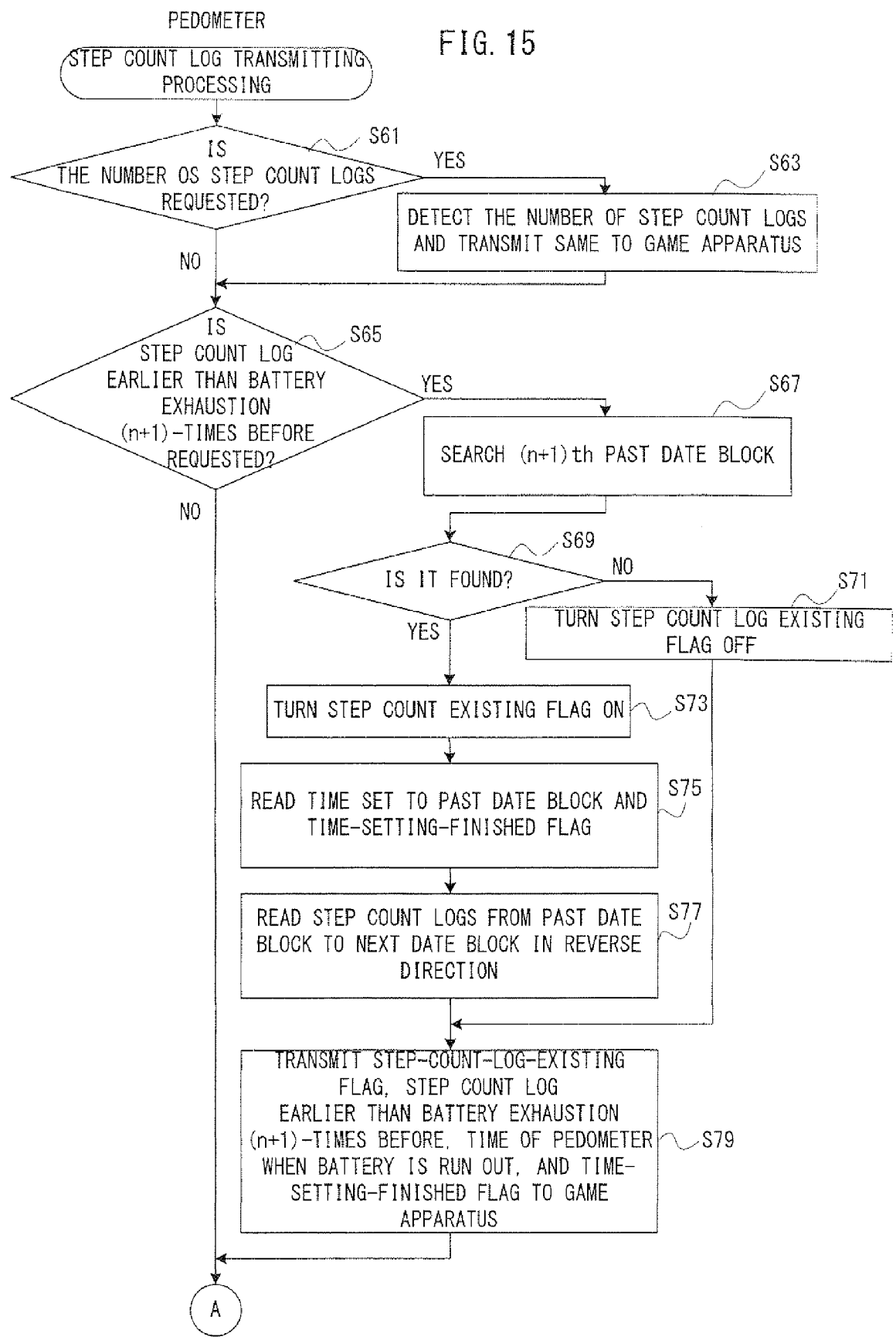
FIG. 15 is a flowchart showing a part of one example of an operation of step count log transmitting processing of the pedometer.
Figure 16:
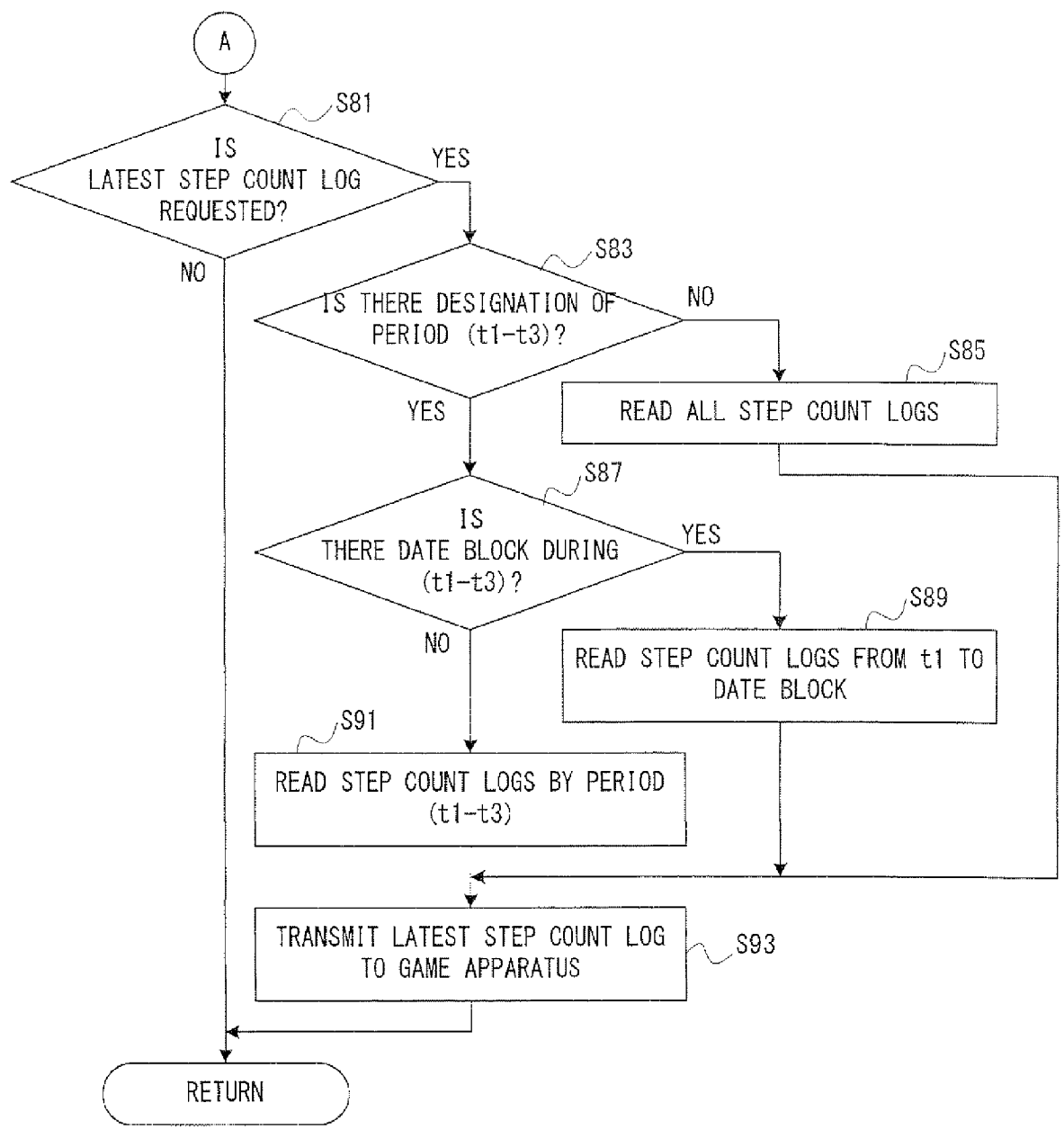
FIG. 16 is a flowchart showing a sequel of FIG. 15.

FIG. 15 and FIG. 16 show one example of an operation of step count log transmitting processing of the pedometer 100. When the push button 104 of the pedometer 100 is pressed, the pedometer 100 transmits predetermined data for starting a communication to the game apparatus 10, and starts to communicate with the game apparatus 10. The step count log transmitting processing is executed every certain length of time after the start of the communication with the game apparatus 10.

The microcomputer 110 determines whether or not the number of step count logs is requested from the game apparatus 10 in a step S61. As described later, the game apparatus 10 requests the pedometer 100 to transmit the number of step count logs in order to determine whether or not a replacement of the battery is performed in the pedometer 100 in a case that time-setting-finished flag is turned on. The number of step count longs requested here is the number of step count values recorded from the previously-acquired time t3 to the present.

If "YES" in the step S61, the microcomputer 110 detects the number of step count logs and transmits the same to the game apparatus 10 in a step S63. The time stored in the currently-effective date block "◆" 400 indicates the time of the step count value of the memory area "⊚" 402 earlier by the predetermined length, and therefore, the microcomputer 100 can specify the detecting time of each of the step count values. Accordingly, the microcomputer 100 can detect the number of step count values recorded from the present to the previously-acquired time t3 by searching backward the step count log buffer 314 from the writing position 408 in the reverse direction. In a case that initialization processing is executed from the current time to the previously-acquired time t3, recording the step count values is suspended, so that the number of step count values to be recorded is less than the number of step count values to be eventually recorded from the current time to the previously-acquired time t3. On the other hand, if "NO" in the step S61, the process proceeds to a step S65 as it is.

In the step S65, the microcomputer 110 determines whether or not step count logs earlier than the battery exhaustion (n+1)-times before is requested. The game apparatus 10 requests step count logs earlier than the battery exhaustion (n+1)-times before when a replacement of the battery is performed in the pedometer 100 as described later.

If "YES" in the step S65, the microcomputer 110 searches the (n+1)th past date block "◇" 410 from the writing position 408 in the reverse direction in a step S67. If the step count logs earlier than the battery exhaustion (n+1)-times before are stored, a (n+1) past date block "◇" 410 is stored in the step count log buffer 314.

Then, in a step S69, the microcomputer determines whether or not th past date block "◇" 410 is found. If "NO" in the step S69, that is, if the (n+1)th past date block "◇" 410 cannot be found through the circle from the writing position 408, the microcomputer 110 turns the step-count-log-existing flag off in a step S71. Here, the step-count-log-existing flag is a flag to show whether or not the step count logs earlier than the battery exhaustion (n+1)-times before exists, and is data included in the data to be returned to the game apparatus 10. After completion of the step S71, the process proceeds to a step S79.

On the other hand, if "YES" in the step S69, that is, if the (n+1)th past date block "◇" 410 exists, the microcomputer 110 turns on the step-count-log-existing flag in a step S73.

Succeedingly, in a step S75, the microcomputer 110 reads the time set to the past date block "◇" 410 and the time-setting-finished flag. The time indicates the time of the pedometer 100 when the battery is run out. Furthermore, the time-setting-finished flag is a time-setting-finished flag in relation to the time, that is, indicates whether or not the time is a time set on the basis of the time of the game apparatus 10. The time and time-setting-finished flag are data to be included in the data to be returned to the game apparatus 10.

Furthermore, in a step S77, the microcomputer 110 reads the step count logs from the past date block "◇" 410 to the next date block in the reverse direction from the step count log buffer 314. The next date block is the past date block "◇" 410 or the currently-effective date block "◆" 400. The read step count logs are the step count logs earlier than the battery exhaustion (n+1)-times before.

Then, in a step S79, the microcomputer 110 transmits the step-count-log-existing flag, the step count logs earlier than the battery exhaustion (n+1)-times before, the time of the pedometer 100 when the battery is run out, and the time-setting-finished flag to the game apparatus 10. Here, if "NO" is determined in the step S69, the data including only the step-count-log-existing flag is returned.

On the other hand, if "NO" in the step S65, the process proceeds to a step S81 in FIG. 16. Here, since the game apparatus 10 of this embodiment requests a step count log every battery exhaustion until it is determined that the step count log earlier than the battery exhaustion (n+1)-times before does not exist as described later, until the data indicating that the step-count-log-existing flag is turned off is transmitted to the game apparatus 10 in a step S79, the processing from the steps S65 to S79 is repeatedly executed in response to the request of the step count log.

In a step S81 in FIG. 16, the microcomputer 110 determines whether or not a latest step count log is requested. The game apparatus 10 requests the pedometer 100 to transmit the latest step count log as described later. Furthermore, the game apparatus 10 requests the step count logs from the previously acquired time t3 to the current time t1. Here, if the period from the previously acquired time t3 to the current time t1 is longer than the period corresponding to the maximum number of step counts logs being recordable in the step count log buffer 314, all the latest step count logs are requested.

If "YES" in the step S81, the microcomputer 110 determines whether or not the (t1-t3) period is designated in a step S83. If "NO" in the step S83, that is, if all the latest step count logs are requested, the microcomputer 110 reads all the step count logs from the step count log buffer 314 in a step S85. Since the elapsed time from the previously-acquired time t3 to the current time t1 is longer than the period corresponding to the maximum number of step counts logs being recordable in the step count log buffer 314, in the step count log buffer 314, the latest step count logs, that is, only the step count logs which are currently being recorded are stored, and step count logs earlier than the battery exhaustion once before are not recorded. Accordingly, all the step count logs are read. After completion of the step S85, the process proceeds to a step S93.

On the other hand, if "YES" in the step S83, that is, if the designation data from the current time t1 to the previously-acquired time t3 is included in the request data, the microcomputer 110 determines whether or not the date block exists during the period (t1-t3) in a step S87. When initialization is executed in the pedometer 100 from the previously-acquired time t3 to the current time t1 due to a replacement of the battery, etc., the past date block "◇" 410 exists from the writing position 408 to the memory area of the step count value corresponding to the previously-acquired time t3 in the reverse direction, and therefore, the step count logs from the writing position 408 to the past date block "◇" 410 are the latest step count logs. If "YES" in the step S87, the microcomputer 110 reads the step count logs from the current time t1 to the past date block "◇" 410 in a step S89. On the other hand, if "NO" in the step S87, the microcomputer 110 reads the step count logs by the (t1-t3) period, that is, the step count logs from the writing position 408 to the memory area of the step count value corresponding to the previously-acquired time t3 in a step S91.

Succeedingly, in the step S93, the microcomputer 110 transmits the read latest step count logs to the game apparatus 10. Here, if "NO" in the step S81, the step count log transmitting processing is ended as it is.

Figure 17:
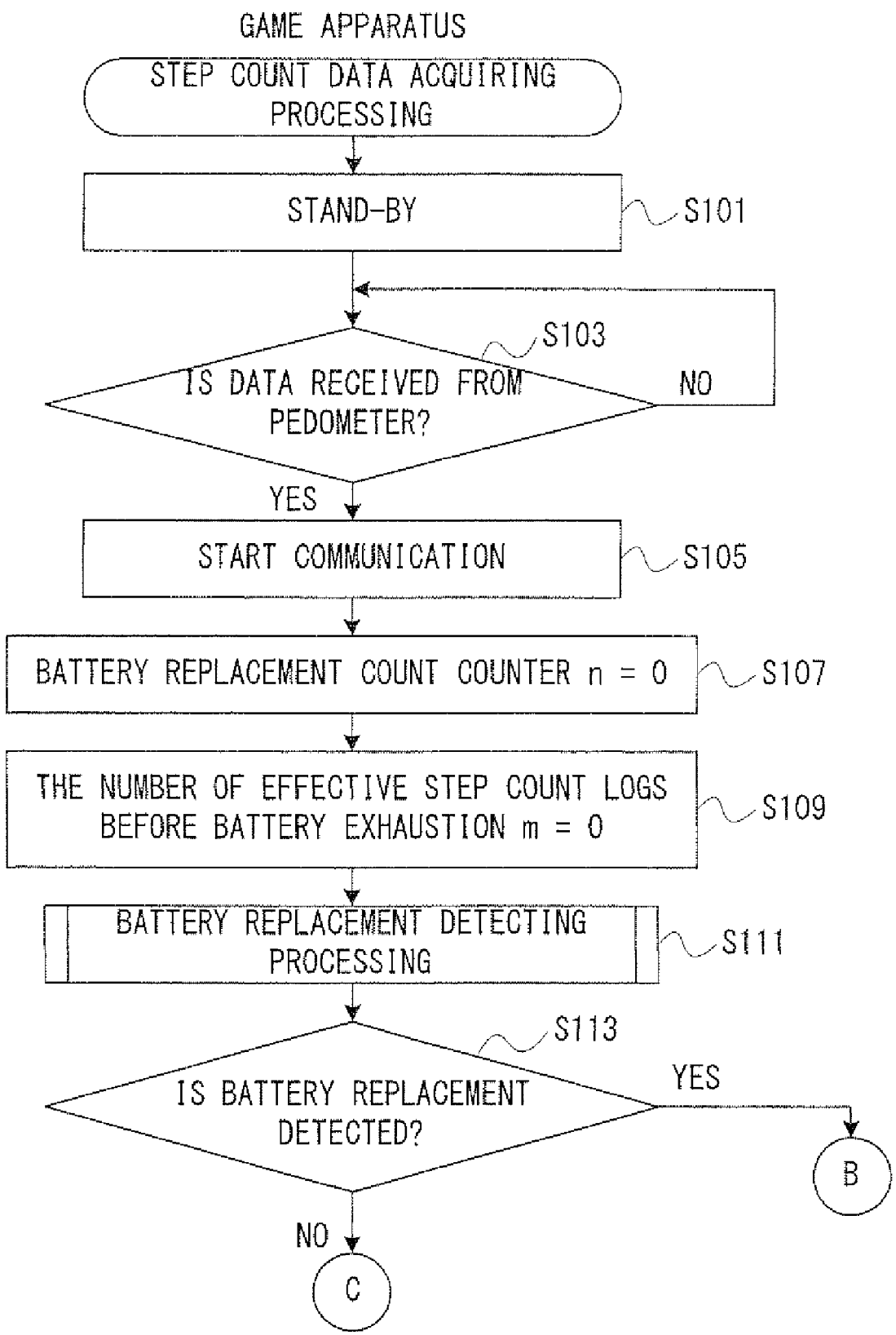
FIG. 17 is a flowchart showing a part of one example of an operation of step count data acquiring processing of the game apparatus.
Figure 18:
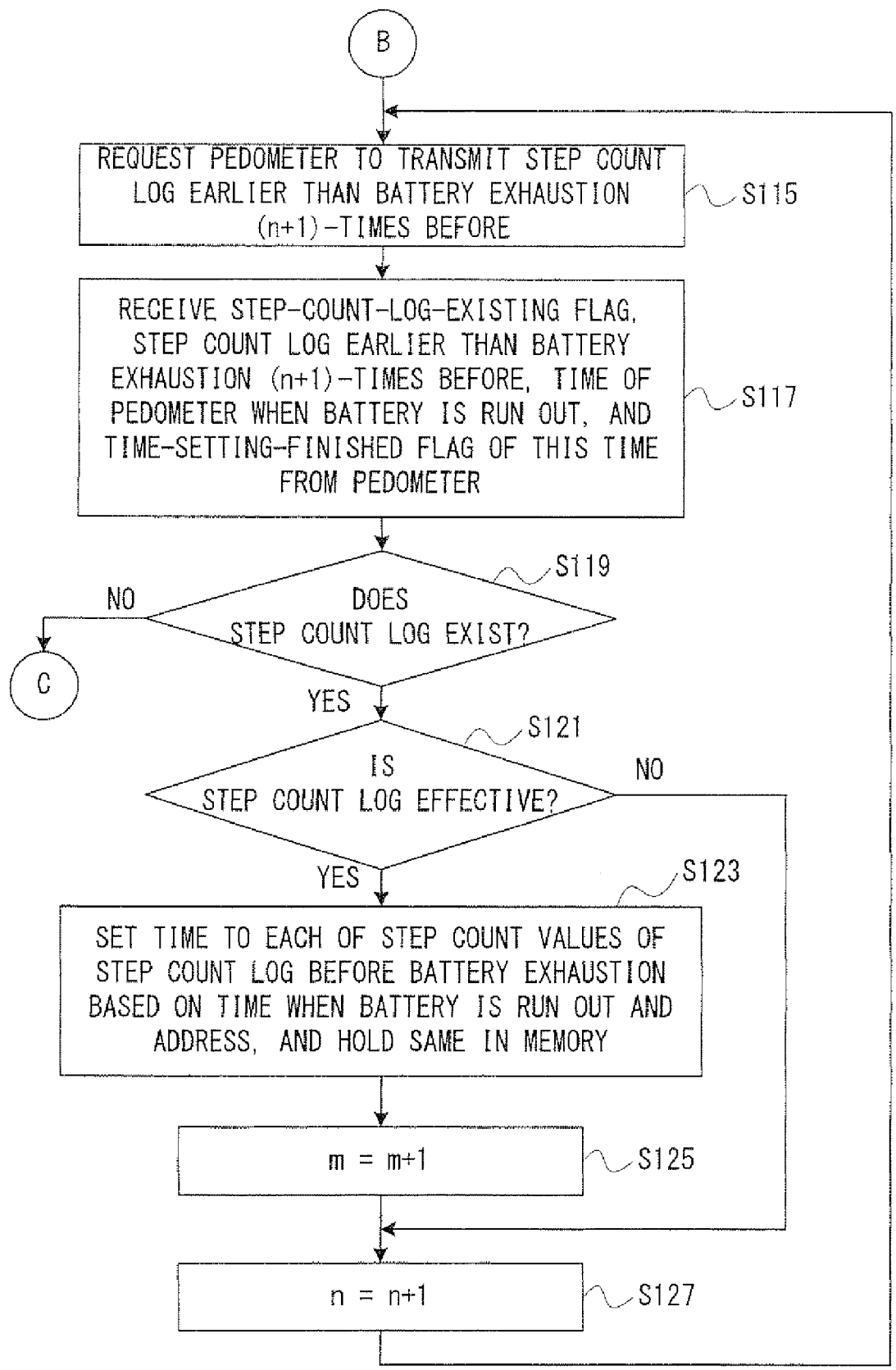
FIG. 18 is a flowchart showing a sequel of FIG. 17.
Figure 19:
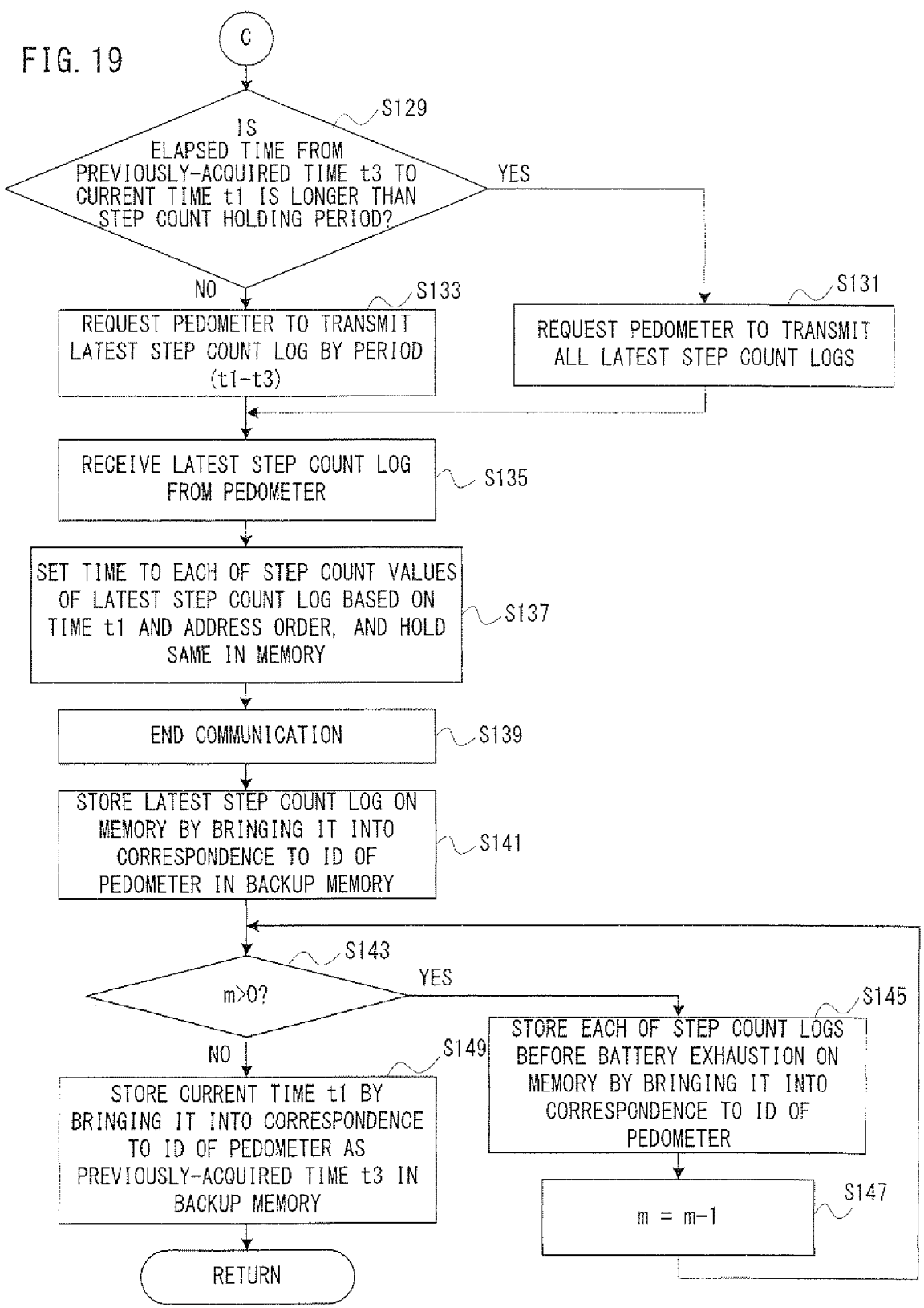
FIG. 19 is a flowchart showing a sequel of FIG. 17 and FIG. 18.

FIG. 17-FIG. 19 show one example of an operation of step count data acquiring processing of the game apparatus 10. The step count data acquiring processing is executed at a predetermined timing or in response to a predetermined operation with the operating switch 22.

When the step count data acquiring processing is started, the CPU core 34 executes a communication stand-by processing in a step S101. By the microcomputer 66 of the memory card 28, the Ir communication circuit 70 enters a communication stand-by state. Here, at this time, a screen including a text instructing the user to start a communication by pressing the push button 104 with the pedometer 100 turned to the game apparatus 10 may be displayed on the first LCD 12 or the second LCD 14.

The CPU core 34 determines whether or not data is received from the pedometer 100 in a step S103. The processing in the step S103 is executed every certain length of time until the game apparatus 10 acquires data from the pedometer 100. The data is transmitted in response to the push button 104 of the pedometer 100 being pressed, and includes identification information (ID) of the pedometer 100. By performing in advance registration processing of an ID of the pedometer 100 managed by the game apparatus 10 in the initial setting and storing the ID in the backup memory 68, it is possible to determine the data from the pedometer 100. If "YES" in the step S103, the CPU core 34 starts a communication with this pedometer 100 in a step S105.

Succeedingly, in a step S107, the CPU core 34 sets an initial value 0 to a variable (battery replacement count counter) n for counting the number of replacements of the battery. Furthermore, in a step S109, the CPU core 34 sets an initial value 0 to a variable m for counting the number of effective step count logs before the battery exhaustion.

In a succeeding step S111, the CPU core 34 executes battery replacement detecting processing. The battery replacement detecting processing is for determining whether or not a replacement of the battery is performed in the pedometer 100, that is, for detecting initialization processing is executed in the pedometer 100. One example of an operation of the battery replacement detecting processing is shown in FIG. 20.

Figure 20:
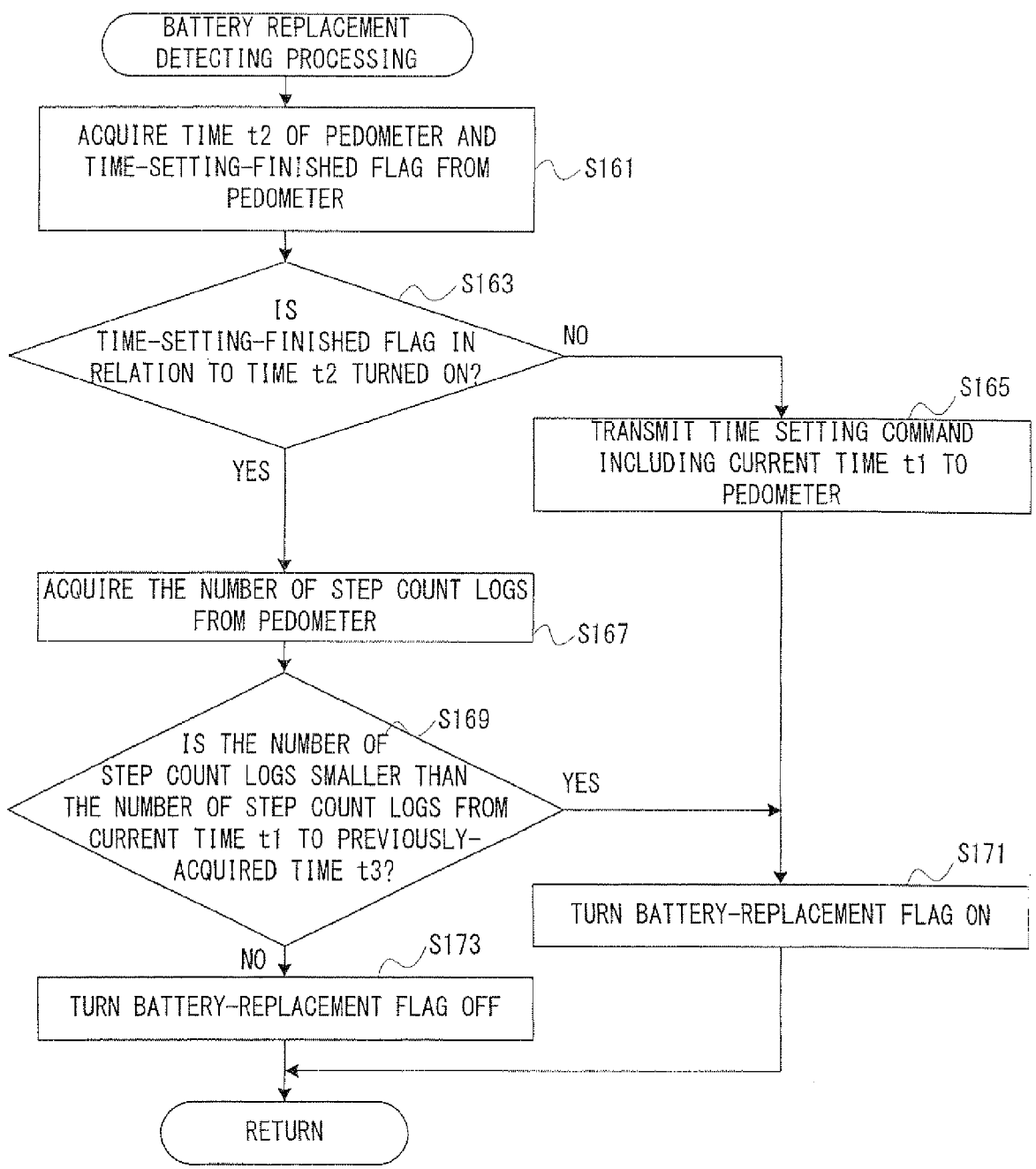
FIG. 20 is a flowchart showing one example of an operation of battery replacement detecting processing in FIG. 17.

When the battery replacement detecting processing is started, in a first step S161 in FIG. 20, the CPU core 34 acquires the current time t2 of the pedometer 100 and the time-setting-finished flag from the pedometer 100. More specifically, the CPU core 34 transmits a request of the current time t2 and the time-setting-finished flag to the pedometer 100. Receiving the request, the microcomputer 110 of the pedometer 100 reads the time-setting-finished flag stored in the currently-effective date block "♦" 400 of the step count log buffer 314 and the current time t2 of the memory area 312, and transmits the time-setting-finished flag and the current time t2 to the game apparatus 10. The CPU core 34 receives the time-setting-finished flag and the current time t2 from the pedometer 100, and stores the same in the RAM 42.

In a step S163, the CPU core 34 determines whether or not the time-setting-finished flag in relation to the current time t2 is turned on, that is, whether or not the current time t2 of the pedometer 100 is set and then counted on the basis of the time of the game apparatus 10. In a case that initialization processing is executed in the pedometer 100, the current time t2 of the pedometer 100 is reset to the initial value and counted, and the time-setting-finished flag is turned off as described above. Accordingly, in the step S163, it is determined whether or not the pedometer 100 is not in an initial state.

If "NO" in the step S163, that is, if the pedometer 100 is in an initial state, the CPU core 34 transmits a time setting command including the current time t1 to the pedometer 100 in a step S165. In response to the time setting command, in the pedometer 100, the time setting processing (FIG. 14) is executed as described above to set the time t2 of the pedometer 100 to the time t1 of the game apparatus 10, and turn on the time-setting-finished flag in relation to the time. After completion of the step S165, the process proceeds to a step S171.

On the other hand, if "YES" in the step S163, that is, if the pedometer 100 is not in an initial state, the process proceeds to a step S167. When the initialization processing is executed in the pedometer 100, the time-setting-finished flag is turned off, and therefore, by determining the time-setting-finished flag in the step S163, it is possible to detect initialization of the pedometer 100 naturally caused due to a replacement of the battery or malfunction, etc. However, if the pedometer 100 is used in a plurality of software, in a case that the time-setting-finished flag is executed by the game apparatus 10 which runs the software A, the game apparatus 10, when running the software B, cannot detect initialization. Thereupon, by the processing in the steps S167 and S169, detection of the initialization in the pedometer 100 is intended.

More specifically, in the step S167, the CPU core 34 acquires the number of step count logs from, the pedometer 100. More specifically, the CPU core 34 transmits a request of the number of step count logs to the pedometer 100. Since the number of step count logs (the number of step count values) from the previously-acquired time t3 to the present need to be acquired, the request data includes the previously-acquired time t3. Receiving the request, the microcomputer 110 of the pedometer 100 detects the number of step count logs in the above-described step count log transmitting processing (steps S61-S63 in FIG. 15) and transmits the same to the game apparatus 10. The CPU core 34 receives the number of step count logs, and stores the same in the RAM 42.

In the succeeding step S169, the CPU core 34 determines whether or not the number of step count logs is smaller than the number of step count logs from the current time t1 to the previously-acquired time t3. In a case that battery exhaustion occurs in the pedometer 100 from the previously-acquired time t3 to the present, and a replacement of the battery is performed, interruption of recording the step count values makes the number of step count logs smaller than the number of step count logs (the number of step count values) to be recorded from the previously-acquired time t3 to the current time t1. Here, if an elapsed time from the previously-acquired time t3 to the current time t1 is longer than the maximum period, which can be recorded in the step count log buffer 314, the number of step count logs to be recorded from the previously-acquired time t3 to the current time t1 is the number of step count logs to be recorded during the maximum period.

If "YES" in the step S169, that is, if there is a possibility of a replacement of the battery being performed from the previously-acquired time t3 to the present pedometer 100, the process proceeds to the step S171.

Thus, since execution of a replacement of the battery (initialization processing) is determined on the basis of the number of step count values stored from the previously-acquired time t3 to the current time t1, even if the pedometer 100 is shared among the plurality of software, in each software processing, execution of initialization processing in the pedometer 100 can be detected. As in this embodiment, in a case that the flag (the time-setting-finished flag) which is turned off in response to the execution of the initialization processing and is turned on in response to the transmission processing of the step-count-data flag is stored in the pedometer 100, the above-described flag is switched in the processing of each software. Thus, when step count data is first acquired in the game apparatus 10 by one software processing, in another software executed thereafter, it is impossible to detect the execution of the initialization processing. However, in a case that the number of step count values from the previously-acquired time t3 to the present is detected, even if the one software is first executed, the number of step count values is not changed, and therefore, it is possible to detect execution of the initialization processing even in the software to be executed thereafter.

Additionally, as described above, in a case that one pedometer 100 is shared by a plurality of software programs, the time-setting-finished flag may not function as a flag for indicating whether or not initialization is executed. However, in a case that a pedometer 100 is used in only one software, the time-setting-finished flag becomes a flag for indicating whether or not initialization is executed, and therefore, in this case, the processing in the steps S167 and S169 may be omitted.

In the step S171, the CPU core 34 turns the battery-replacement flag on. The battery-replacement flag is a flag for determining whether or not a replacement of the battery (initialization processing) is performed in the pedometer 100, and the battery-replacement flag also indicates whether or not past step count logs are recorded in the pedometer 100. On the other hand, if "NO" in the step S169, the CPU core 34 turns the battery-replacement flag off in a step S173. After completion of the step S171 or S173, the battery replacement detecting processing is ended, and the process is returned to a step S113 in FIG. 17.

In the step S113, the CPU core 34 detects whether or not a replacement of the battery is detected, that is, determines whether or not the battery-replacement flag is turned on. If "YES" in the step S113, the process proceeds to a step S115 in FIG. 18 to perform acquisition of the past step count logs (step count logs before the battery exhaustion). On the other hand, if "NO" in the step S113, the process proceeds to a step S129 in FIG. 19 as it is.

In the step S115 in FIG. 18, the CPU core 34 requests the pedometer 100 to send a step count log earlier than the battery exhaustion (n+1) times before. At the first request, an initial value 0 is set to the variable n, and therefore, a step count log earlier than the battery exhaustion once before is requested. In response thereto, in the pedometer 100, the above-described step count log transmitting processing (steps S65-S79 in FIG. 15) is executed to transmit the data including the step-count-log-existing flag, a step count log earlier than the battery exhaustion (n+1) times before, a time of the pedometer 100 when the battery is run out and the time-setting-finished flag in relation to the time to the game apparatus 10.

In response thereto, in a step S117, the CPU core 34 receives the data including the step-count-log-existing flag, the step count log earlier than the battery exhaustion (n+1) times before, a time of the pedometer 100 when the battery is run out and the time-setting-finished flag in relation to the time from the pedometer 100, and stores the same in the RAM 42.

Then, in a step S119, the CPU core 34 determines whether or not the step count log exists, that is, whether or not the step-count-log-existing flag is turned on.

If "YES" in the step S119, the CPU core 34 determines whether or not the step count log is effective data in a step S121. More specifically, it is determined whether or not the time-setting-finished flag is turned on. Here, the effective data is data which is able to set an appropriate time as a detecting time of each step count value of the step count log. If the received time-setting-finished flag is turned off, the received time of the pedometer 100 when the battery is run out is a time counted on the basis of the initial value and not set on the basis of the time of the game apparatus 10, that is, is not correct. Accordingly, the time being associated with the step count value is not clear, and an appropriate time cannot be set to each step count value of the step count log, and thus, the step count log is dealt as ineffective data. For example, it is possible to remove step count data of inaccurate time information stored when the replacement of the battery cannot be smoothly, resulting in repetitive detachment and attachment of the battery, or when the battery is replaced with a battery with, less remaining amount.

If "YES" in the step S121, the CPU core 34 sets the time to each of the step count values of the step count logs before the battery exhaustion on the basis of the time when the battery is run out and the address order in a step S123, and holds each of the step count values and the time in the memory (RAM 42). As described above, the time when the battery is run out is the time stored in the past date block "◇" 410, and is the detecting time of the step count value of the memory area "◉" 402 indicated by the past date block "◇" 410. Furthermore, each, step count value of the step count, log is stored for each unit of time in the address order. Accordingly, the detecting times of each of the step count values is calculated on the basis of the address order in the step count log and the time when the battery is run out, and thus, it is possible to bring each of the step count values and the time into correspondence to each other.

Thus, since the time can be set to each step count value of the effective step count log, the CPU core 34 increments the variable m for counting; the number of effective step count logs by one in a step S125. On the other hand, if "NO" in the step S121, that is, if the time-setting-finished flag is turned off, an appropriate time setting cannot be performed, and therefore, the process proceeds to a step S127 as it is.

In the step S127, the CPU core 34 increments the variable n for counting the number of replacements of the battery by one. That is, since the step count logs earlier than the battery exhaustion (n+1)-times before exist, the number of replacements of the battery is counted. After completion of the step S127, the process returns to the step S115. Accordingly, acquisition of step count logs earlier than the battery exhaustion the (n+2) times before is performed.

In this embodiment, only when the battery replacement detecting processing is performed, and execution of the replacement of the battery (initialization processing) is then detected, data stored before the initialization processing is acquired from the pedometer 100. Thus, in the pedometer 100, searching and transmitting data stored before the initialization processing is executed as necessary, and therefore, it is possible to reduce a processing load. Furthermore, not processing of constantly transmitting all the data stored in the step count log buffer 314 of the pedometer 100 to the game apparatus 10 and searching data before the initialization processing in the game apparatus 10, but processing of transmitting only the necessary data from the pedometer 100 is executed, capable of reducing an amount of data to be communicated.

On the other hand, if "NO" in the step S119, since the step count logs earlier than the battery exhaustion (n+1)-times before is no longer stored in the pedometer 100, the acquisition of the past step count log is ended, and the process proceeds to a step S129 in FIG. 19.

In the step S129 in FIG. 19, the CPU core 34 determines whether or not an elapsed time from the previously-acquired time t3 to the current time t1 is longer than a step count holding period. The step count log holding period is equivalent to the time taken in order to record the maximum number of step count values which can be held in the step count log buffer 314. In the step S129, it is determined whether or not a time longer than the step count log holding period elapses from previously-acquired time t3.

If "YES" in the step S129, that is, if the elapsed time from the previously-acquired time t3 is longer than the step count log holding period, it can be determined that only the latest step count logs are recorded in the step count log buffer 314 of the pedometer 100. Accordingly, in a step S131, the CPU core 34 requests the pedometer 100 to transmit all the latest step count logs. As shown in FIG. 16 described above, the pedometer 100 reads all the step count logs in response thereto, and transmits the same to the game apparatus 10.

On the other hand, if "NO" in the step S129, that is, if the elapsed time from the previously-acquired time t3 is within the step count log holding period, the CPU core 34 requests the pedometer 100 to transmit the latest step count logs by the period (t1-t3) in a step S133. The request data includes at least the previously-acquired time t3, that is, the request data includes designation of the period from the current time t1 to the previously-acquired time t3. As shown in FIG. 16 as described above, the pedometer 100 reads the latest step count logs during the period in response to the request and transmits the same to the game apparatus 10.

In a succeeding step S135, the CPU core 34 receives the latest step count logs from the pedometer 100 and stores the same in the RAM 42. In a step S137, the CPU core 34 sets the times to each of the step count values of the latest step count logs on the basis of the current time t1 and the address order, and holds each of the step count values and the time in the memory (RAM 42). Here, as shown in FIG. 11 described above, the writing position 408 is the memory for recording at the tip end, and the writing position 408 corresponds to the current time t1. The detecting time of each step count value can be obtained by subtracting the unit of time from the current time t1 every time that the address of each of the step count values in the latest step count logs is decreased from the writing position 408 by a predetermined length, and each step count value and the time are brought into correspondence. In a step S139, the CPU core 34 ends the communication with the pedometer 100.

Succeedingly, in a step S141, the CPU core 34 stores each of the latest step count logs on the memory (RAM 42) by bringing it into correspondence to the ID of the pedometer 100 in the backup memory 68.

In a step S143, the CPU core 34 determines whether or not the variable m for counting the number of effective step count logs before the battery exhaustion is above 0. If "YES" in the step S143, the CPU core 34 stores each of the step count logs before the battery exhaustion on the memory (RAM 42) by bringing it into correspondence to the IDs of the pedometer 100 in the backup memory 68 in a step S145.

In a step S147, the CPU core 34 decrements the variable m by one. Then, the process returns to the step S143. Accordingly, all the effective step count logs are stored in the backup memory 68. In the steps S141 and step S145, the step count data is stored by bringing it into correspondence to the ID of the pedometer 100, and therefore, in a case that the system 1000 includes a plurality of pedometers 100, the step count managing apparatus 10 can manage the step count data of the plurality of pedometers 100. Furthermore, with respect to the step count data before the replacement of the battery, the time of each, step count value is set on the basis of the time stored in each pedometer 100, and therefore, accuracy of the time of each step count value can be maintained. Additionally, with respect to the step count data after the replacement of the battery, the time of each step count value is set on the basis of the time of the step count managing apparatus 10, and therefore, even if the respective clocks of the plurality of pedometers 100 tick different times, it is possible to maintain consistency among the times. Accordingly, it is possible to improve accuracy of the recording time of the step counts.

On the other hand, if "NO" in the step S143, that is, if the storing the effective step count log is ended, the CPU core 34 stores the current time t1 as a previously-acquired time t3, and stores the previously-acquired time t3 by bringing it into correspondence to the ID of the pedometer 100 in the backup memory 68 in a step S149. Since the previously-acquired time t3 is also stored by bringing it into correspondence to the ID of the pedometer 100, the step count managing apparatus 10 can manage the plurality of pedometers 100. After completion of the step S149, the step count data acquiring processing is ended.

According to this embodiment, in the initialization processing, the time of the currently-effective date block (first time data) being associated with the step count values stored before an initialization is stored as a past date block (second time data distinguishable from the first time data), and therefore, it is possible to distinguish the step count values and the times which are stored between before and after the initialization processing. Accordingly, the recording time of each of the step count values stored after the initialization processing can be set on the basis of the time of the step count managing apparatus 10, and the recording time of each of the step count values stored before the initialization processing can be set on the basis of the time of the pedometer 100. Thus, it is possible to improve accuracy of the recording time of each of the step counts. Furthermore, it is possible to set a proper recording time depending on the presence or absence of initialization processing executed due to a replacement of a battery, etc. in the pedometer 100. In addition, there is little need of concerning about accuracy of the time of the pedometer 100, so that a cheap pedometer 100 can be used, capable of implementing cost savings of the step count measuring system 1000.

Furthermore, in this embodiment, since setting a recording time of each step count value is performed in the step count managing apparatus 10, it is possible to reduce a processing load on the pedometer 100.

Additionally, in the above-described embodiment, the time of each of the step count values is calculated in the game apparatus 10, and each of the step count values and the time are brought into correspondence to each other. However, in another embodiment, with respect to each of the step count values stored before the initialization processing, that is, each of the step count values of the step count logs before the battery exhaustion, the recording time may be set in the pedometer 100 on the basis of the time stored in the past date block "◇" 410, and data which brings each step count value and the time into correspondence to each other may be transmitted to the game apparatus 10. In addition, with respect to each of the step count values recorded after the initialization processing, that is, each of the step count values of the latest step count logs, the current time t1 is transmitted from the game apparatus 10, and on the basis of the current time t1, the time of each of the step count values is set in the pedometer 100, and data which brings each of the step count values and the time into correspondence to each other may be transmitted to the game apparatus 10.

Furthermore, in this embodiment, a time corresponding to one step count, value is stored, and the time of each of the step count values is calculated from the stored time on the basis of the address order. However, in another embodiment, if there is no need of taking the capacity of the memory into consideration, respective detecting (recording) times may be stored by being brought into correspondence to respective step count values. This eliminates the need of calculation processing of a time of each of the step count values according to the address order, capable of reducing a processing load.

Although the present invention has been described and illustrated in detail, it is clearly understood that the same is by way of illustration and example only and is not to be taken by way of limitation, the spirit and scope of the present invention being limited only by the terms of the appended, claims.

What is claimed is:

1. A step count measuring system including a pedometer and a step count managing apparatus which are able to communicate with each other, wherein said pedometer comprises:
   a first time-counting unit for counting a time,
   a detecting unit for detecting a step count value for each unit of time,
   a step count data storing unit for storing the step count value sequentially detected by said detecting unit,
   a first time data storing unit for storing, as first time data, the time counted by said first time-counting unit by bringing the first time data into association with the step count value stored by said step count data storing unit, and
   a second time data storing unit for storing said time stored as said first time data by said first time data storing unit as second time data being distinguishable from said first time data in initialization processing started in response to a reset, wherein
said step count managing apparatus comprises:
   a second time-counting unit for counting a time,
   a first recording time setting unit for setting a recording time of each step count value associated with said first time data on the basis of the time counted by said second time-counting unit, and
   a second recording time setting unit for setting a recording time of each step count value associated with said second time data on the basis of said second time data.

2. A step count measuring system according to claim 1, wherein
   said step count managing apparatus further comprises a data acquiring unit for acquiring at least the step count value stored by said step count data storing unit and said second time data stored by said second time data storing unit from said pedometer, and
   said first recording time setting unit and said second recording time setting unit are provided to said step count managing apparatus, and performs settings of said recording times on the basis of the data acquired by said data acquiring unit.

3. A step count measuring system according to claim 2, wherein
   said pedometer further comprises an initializing flag storing unit for storing a flag to indicate whether or not said initialization processing is executed,
   said step count managing apparatus further comprises a first determining unit for determining whether or not said initialization processing is executed in said pedometer by said flag acquired from said pedometer, and
   said data acquiring unit acquires said second time data and said step count value associated with said second time data from said pedometer when said first determining unit determines that said initialization processing is executed.

4. A step count measuring system according to claim 2, wherein
   said step count managing apparatus further comprises a previously-acquired-time storing unit for storing the time counted by said second time-counting unit as a previously-acquired time when the recording time of said step count value associated with said first time data by said first recording time setting unit is set,
   said pedometer further comprises a number detecting unit for detecting the number of step count values stored from said previously-acquired time acquired from said step count managing apparatus to the present,
   said step count managing apparatus further comprises a second determining unit for determining whether or not said initialization processing is executed in said pedometer on the basis of the number of step count values acquired from said pedometer, and
   said data acquiring unit acquires said second time data and said step count value associated with said second time data from said pedometer when said second determining unit determines that said initialization processing is executed.

5. A step count measuring system according to claim 1, wherein
   said step count data storing unit stores each step count value in an address order,
   said first time data storing unit stores the time corresponding to one step count value as said first time data,
   said first recording time setting unit sets the recording time of each of the step count values associated with said first time data on the basis of the address order and the time counted by said second time-counting unit, and
   said second recording time setting unit sets the recording time of each of the step count values associated with said second time data on the basis of the address order and said second time data.

6. A step count measuring system according to claim 1, wherein
   said first time data storing unit stores the time counted by said first time-counting unit every predetermined timing by changing a storing position.

7. A step count measuring system according to claim 1, wherein
   said step count managing apparatus further comprises a time transmitting unit for transmitting the time counted by said second time-counting unit to said pedometer, and
   said pedometer further comprises a time setting melt it for setting, when said time transmitted by said time transmitting unit is received, the time counted by said first time-counting unit to the received time.

8. A step count measuring system according to claim 7, wherein
   said first time data storing unit further stores a flag for indicating whether or not said time is the time on which the setting by said time setting unit has been performed, and
   said second recording time setting unit does not perform setting of the recording time of each step count value associated with said second time data when it is determined by said flag that said second time data is not the time on which the setting by said time setting unit has been performed.

9. A step count measuring system according to claim 1, wherein
   a plurality of pedometers are included,
   said first recording time setting unit sets the recording time of each step count value of each pedometer associated with said first time data on the basis of the time counted by said second time-counting unit, and
   said second recording time setting unit sets the recording time of each step count value of each pedometer associated with said second time data on the basis of said second time data of each pedometer.

10. A pedometer which is able to communicate with a step count managing apparatus for setting a recording time of a step count in a step count measuring system, comprising:
   a first time-counter for counting a time,
   a detector for detecting a step count value for each unit of time,
   a step count data storage device for storing the step count value sequentially detected by said detector,
   a first time data storage device for storing, as first time data, the time counted by said first time-counter by bringing the first time data into association with the step count value stored by said step count data storage device,
   a second time data storage device for storing said time stored as said first time data by said first time data storage device as second time data being distinguishable from said first time data in initialization processing started in response to a reset, and
   a data transmitter for transmitting at least the step count value stored by said step count data storage device and said second time data stored by said second time data storage device to said step count managing apparatus.

11. A non-transitory storage medium storing a program of a pedometer which is able to communicate with a step count managing apparatus which sets a recording time of a step count in a step count measuring system, wherein said program causes a computer of said pedometer to provide functionality comprising:
   a first time-counting for counting a time,
   a detection for detecting a step count value for each unit of time,
   a step count data storage for storing the step count value sequentially detected by said detection,
   a first time data storage for storing, as first time data, the time counted by said first time-counting by bringing the first time data into association with the step count value stored by said step count data storage,
   a second time data storage for storing said time stored as said first time data by said first time data storage as second time data being distinguishable from said first time data in initialization processing started in response to a reset, and
   a data transmission for transmitting at least the step count value stored by said step count data storage and said second time data stored by said second time data storage to said step count managing apparatus.

12. A step count managing apparatus for setting a recording time of a step count detected by a pedometer in a step count measuring system, wherein said pedometer comprises:
   a first time-counter for counting a time,
   a detector for detecting a step count value for each unit of time,
   a step count data storing unit for storing the step count value sequentially detected by said detector,
   a first time data storing unit for storing, as first time data, the time counted by said first time-counter by bringing the first time data into association with the step count value stored by said step count data storing unit and
   a second time data storing unit for storing said time stored as said first time data by said first time data storing unit as second time data being distinguishable from said first time data in initialization processing started in response to a reset, and the step count managing apparatus comprising:
   a second time-counter for counting a time,
   a data acquiring unit for acquiring at least the step count value stored by said step count data storing unit and said second time data stored by said second time data storing unit from said pedometer,
   a first recording time setter for setting a recording time of each step count value associated with said first time data on the basis of the time counted by said second time-counter, and
   a second recording time setter for setting a recording time of each step count value associated with said second time data on the basis of said second time data.

13. A non-transitory storage medium for storing a program of a step count managing apparatus which sets a recording time of a step count detected by a pedometer in a step count measuring system, wherein
   said pedometer comprises
      a first time-counter for counting a time,
      a detector for detecting a step count value for each unit of time,
      a step count data storing unit for storing the step count value sequentially detected by said detector,
      a first time data storing mean unit for storing, as first time data, the time counted by said first time-counting unit by bringing the first time data into association with the step count value stored by said step count data storing unit, and
      a second time data storing unit for storing said time stored as said first time data by said first time data storing unit as second time data being distinguishable from said first time data in initialization processing started in response to a reset, wherein
   said program causes a computer of said step count managing apparatus to provide execution comprising:
      a second time-counting for counting a time,
      a data acquisition for acquiring the step count value stored by said step count data storing unit and said second time data stored by said second time data storing unit from said pedometer,
      a first recording time setting for setting a recording time of each step count value associated with said first time data on the basis of the time counted by said second time-counting, and
      a second recording time setting for setting a recording time of each step count value associated with said second time data on the basis of said second time data.

14. A method of operating a step count measuring system including a pedometer and a step count managing apparatus which are able to communicate with each other, the method comprising:
   counting a time with a first time counter,
   detecting a step count value for each unit of time,
   storing the step count value,
   storing, as first time data, the time counted by said first time counter by bringing the first time data into association with the stored step count value, the first time data being stored in a first time data storing unit,
   storing said time stored as said first time data by said first time data storing unit as second time data being distinguishable from said first time data in initialization processing started in response to a reset, the second time data being stored in a second time data storing unit,
   counting a time with a second time-counter,
   setting a recording time of each step count value associated with said first time data on the basis of the time counted by said second time-counter, and setting a recording time of each step count value associated with said second time data on the basis of said second time data.

15. A method of operating a pedometer to communicate with a step count managing apparatus for setting a recording time of a step count in a step count measuring system, the method comprising:

counting a time with a first time counter, detecting a step count value for each unit of time, storing the detected step count value, the step count being sequentially detected, storing, as first time data, the time counted by said first time-counter by bringing the first time data into association with the stored step count value, the first time data being stored in a first time data storage, storing said time stored as said first time data by said first time data storage as second time data being distinguishable from said first time data in initialization processing started in response to a reset, the second time data storage being stored in a second time data storage, and transmitting at least the stored step count value and said second time data stored in said second time data storage to said step count managing apparatus.

* * * * *